(12) United States Patent
Ishizaki et al.

(10) Patent No.: US 10,345,982 B2
(45) Date of Patent: Jul. 9, 2019

(54) DETECTION DEVICE

(71) Applicant: Japan Display Inc., Tokyo (JP)

(72) Inventors: Koji Ishizaki, Tokyo (JP); Masahiro Teramoto, Tokyo (JP); Yuji Sato, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/248,247

(22) Filed: Jan. 15, 2019

(65) Prior Publication Data
US 2019/0146613 A1    May 16, 2019

Related U.S. Application Data

(63) Continuation of application No. 15/350,329, filed on Nov. 14, 2016, now Pat. No. 10,216,343.

(30) Foreign Application Priority Data

Nov. 25, 2015 (JP) ................................. 2015-230068

(51) Int. Cl.
*G06F 3/041* (2006.01)
*G06F 3/044* (2006.01)
(52) U.S. Cl.
CPC ............ *G06F 3/044* (2013.01); *G06F 3/0412* (2013.01); *G06F 2203/04103* (2013.01); *G06F 2203/04112* (2013.01)
(58) Field of Classification Search
None
See application file for complete search history.

(56) References Cited

U.S. PATENT DOCUMENTS

| | | |
|---|---|---|
| 2013/0328575 A1 | 12/2013 | Ra et al. |
| 2014/0204043 A1 | 7/2014 | Lin et al. |
| 2014/0240623 A1 | 8/2014 | Matsubara et al. |
| 2015/0002464 A1 | 1/2015 | Nishioka et al. |
| 2015/0029142 A1 | 1/2015 | Kim et al. |
| 2015/0268776 A1 | 9/2015 | Ishizaki et al. |

(Continued)

FOREIGN PATENT DOCUMENTS

| | | |
|---|---|---|
| JP | 2011-018194 | 1/2011 |
| JP | 2013-254469 | 12/2013 |

(Continued)

OTHER PUBLICATIONS

Japanese Office Action dated Jan. 22, 2019 in corresponding Japanese Application No. 2015-230068.

*Primary Examiner* — Gustavo Polo
(74) *Attorney, Agent, or Firm* — K&L Gates LLP

(57) ABSTRACT

According to an aspect, a detection device includes: a substrate; a detection electrode disposed on a plane parallel to a surface of the substrate and including conductive thin wires and electrical coupling portions disposed where the conductive thin wires intersect with each other or are bent, and are coupled with each other, the conductive thin wires being arranged in a mesh-like form; a coupling wire that couples the conductive thin wires with a detecting unit at an end portion of the detection electrode; and a protective layer that is made of an insulation material and that covers the detection electrode and the coupling wire. An area density of the conductive thin wires per unit area is smaller in an end region ranging from an electrical coupling portion closest to the coupling wire to the coupling wire than in a region of the entire detection electrode.

20 Claims, 19 Drawing Sheets

(56) References Cited

U.S. PATENT DOCUMENTS

2015/0268797 A1 9/2015 Kurasawa et al.
2015/0293559 A1 10/2015 Park et al.
2016/0266709 A1 9/2016 Kurasawa

FOREIGN PATENT DOCUMENTS

| JP | 20114-010614 | 1/2014 |
| JP | 2014-225122 | 12/2014 |
| JP | 2014-232338 | 12/2014 |
| JP | 2015-026376 | 2/2015 |
| JP | 2015-156232 | 8/2015 |
| JP | 2015-176573 A | 10/2015 |
| JP | 2015-194996 | 11/2015 |
| JP | 2015-204094 | 11/2015 |

DETECTION DEVICE

CROSS-REFERENCE TO RELATED APPLICATIONS

The present application is a continuation of U.S. application Ser. No. 15/350,329, filed on Nov. 14, 2016, which claims priority from Japanese Application No. 2015-230068, filed on Nov. 25, 2015, the contents of which are incorporated by reference herein in its entirety.

BACKGROUND

1. Technical Field

The present invention relates to a detection device capable of detecting a change in capacitance, and specifically relates to a detection device and a display device, which are capable of detecting an external proximity object based on a change in capacitance.

2. Description of the Related Art

In recent years, a detection device capable of detecting an external proximity object, or a so-called touch panel, has attracted attention. A touch panel is mounted on or integrated with a display device such as a liquid crystal display (LCD) device and used in a display device with a touch detection function. In the display device with the touch detection function, various kinds of button images are displayed on the display device, so that information can be input through the touch panel instead of normal mechanical buttons. The display device with the touch detection function including the touch panel does not need an input device such as a keyboard, a mouse, and a keypad, and has been increasingly used in portable information terminals such as mobile phones in addition to computers.

As a technology of a touch detection device, there are several technologies such as an optical type, a resistive type, and a capacitive type. A capacitive touch detection device has a comparatively simple structure in a portable terminal or the like and can realize low power consumption. Further, in a detection device capable of detecting an external proximity object, low resistance of a detection electrode has been required to make the device thinner, have a large screen, or achieve a high resolution. For the detection electrode, a transparent conductive oxide such as an indium tin oxide (ITO) is used as a material of a transparent electrode. In order to lower the resistance of the detection electrode, it is effective to use a conductive material such as a metallic material. However, when the conductive material such as the metallic material is used, the detection electrode may be corroded. A detection device including a detection electrode covered with a protective layer is disclosed in Japanese Patent Application Laid-open Publication No. 2015-176573.

When the detection electrode has a mesh-like pattern, the detection electrode has low resistance. However, when the detection electrode is coupled to a coupling wire that extends in a different direction from an extending direction of the mesh-like pattern of the detection electrode, the coupling wire blocks the protective layer from spreading, and thus the protective layer does not fill a region in the detection electrode and an air bubble remains in the protective layer, which may lead to nonuniformity of light distribution on a plane, or deterioration in reliability.

For the foregoing reasons, there is a need for a detection device and a display device that suppress an air bubble in the protective layer.

SUMMARY

According to an aspect, a detection device includes: a substrate; a detection electrode that is disposed on a plane parallel to a surface of the substrate and that includes a plurality of conductive thin wires and a plurality of electrical coupling portions disposed where the conductive thin wires intersect with each other or are bent, are coupled with each other, the conductive thin wires being arranged in a mesh-like form; a coupling wire that couples the conductive thin wires with a detecting unit at an end portion of the detection electrode; and a protective layer that is made of an insulation material and that covers the detection electrode and the coupling wire. An area density of the conductive thin wires per unit area is smaller in an end region ranging from an electrical coupling portion closest to the coupling wire to the coupling wire than in a region of the entire detection electrode.

According to another aspect, a detection device includes: a substrate; a detection electrode that is disposed on a plane parallel to a surface of the substrate and includes a plurality of conductive thin wires arranged in a mesh-like form; a coupling wire that couples the conductive thin wires with a detecting unit; and a protective layer that is made of an insulation material and that covers the detection electrode and the coupling wire. An area surrounded by the coupling wire and the conductive thin wires is larger than an area surrounded by a single mesh of the detection electrode.

DETAILED DESCRIPTION

Figure 1:
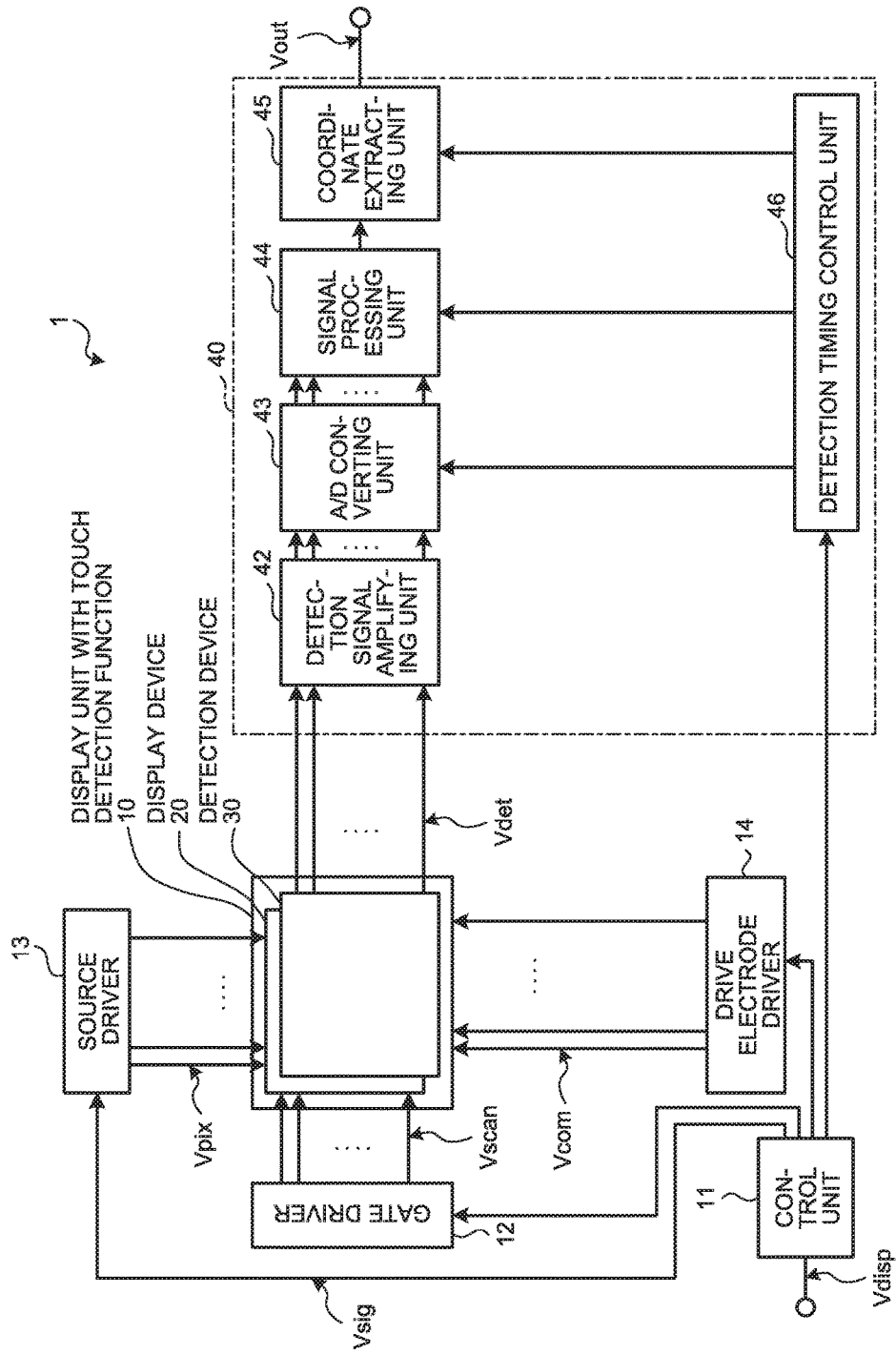
FIG. 1 is a block diagram illustrating an exemplary configuration of a display device with a touch detection function according to a first embodiment of the present invention.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

First Embodiment

FIG. 1 is a block diagram illustrating an exemplary configuration of a display device with a touch detection function according to a first embodiment of the present invention. A display device 1 with a touch detection function includes a display unit 10 with a touch detection function, a control unit 11, a gate driver 12, a source driver 13, a drive electrode driver 14, and a touch detecting unit (also simply referred to as a detecting unit) 40. The display unit 10 with the touch detection function is a device in which a display device 20 employing an LCD element as a display element is integrated with a capacitive type detection device 30. The display unit 10 with the touch detection function may be a device in which the capacitive type detection device 30 is mounted on the display device 20 employing an LCD element as a display element. For example, the display device 20 may be an organic EL display device.

The display device 20 is a device that sequentially scans horizontal lines one by one and performs display according to a scanning signal Vscan supplied from the gate driver 12 as will be described below. The control unit 11 is a circuit that supplies a control signal to the gate driver 12, the source driver 13, the drive electrode driver 14, and the touch detecting unit 40 based on a video signal Vdisp supplied from the outside, and performs control such that the gate driver 12, the source driver 13, the drive electrode driver 14, and the touch detecting unit 40 operate in synchronization with one another.

The gate driver 12 has a function of sequentially selecting one horizontal line as a target of display driving of the display unit 10 with the touch detection function based on the control signal supplied from the control unit 11.

The source driver 13 is a circuit that supplies a pixel signal Vpix to sub pixels SPix (which will be described below) of the display unit 10 with the touch detection function based on the control signal Vsig supplied from the control unit 11.

The drive electrode driver 14 is a circuit that supplies a drive signal Vcom to a drive electrode COML (which will be described below) of the display unit 10 with the touch detection function based on the control signal supplied from the control unit 11.

The touch detecting unit 40 is a circuit that detects whether there is a touch on the detection device 30 (a contact state or a proximity state which will be described below) based on the control signal supplied from the control unit 11 and a detection signal Vdet supplied from the detection device 30 of the display unit 10 with the touch detection function, and that obtains, when there is a touch, coordinates or the like of the touch in a touch detection region. The touch detecting unit 40 includes a detection signal amplifying unit 42, an A/D converting unit 43, a signal processing unit 44, a coordinate extracting unit 45, and a detection timing control unit 46.

The detection signal amplifying unit 42 amplifies the detection signal Vdet supplied from the detection device 30. The detection signal amplifying unit 42 may include a low pass analog filter that removes a high frequency component (a noise component) included in the detection signal Vdet, and that extracts and outputs a touch component.

(Basic Principle of Capacitive Type Touch Detection)

Figure 2:
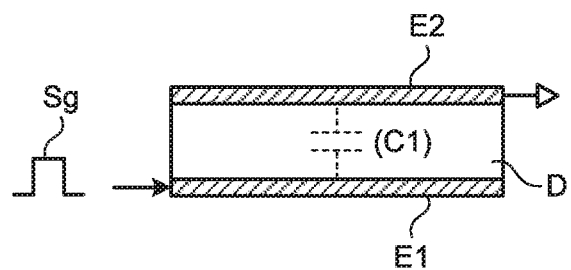
FIG. 2 is a diagram for explaining the basic principle of capacitive type touch detection, illustrating a state in which a finger is neither in contact with nor in proximity to a device.
Figure 3:
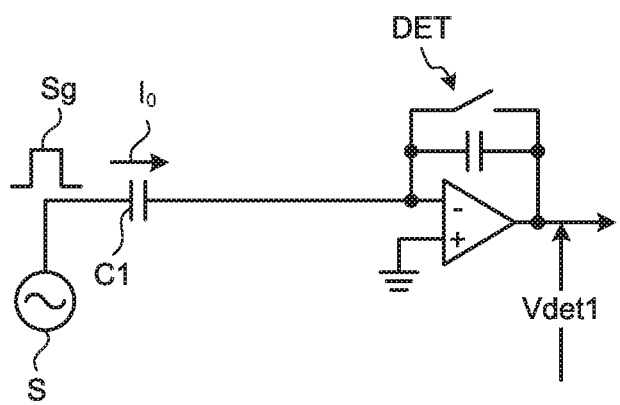
FIG. 3 is a diagram illustrating an example of an equivalent circuit in the state illustrated in FIG. 2 in which the finger is neither in contact with nor in proximity to the device.
Figure 4:
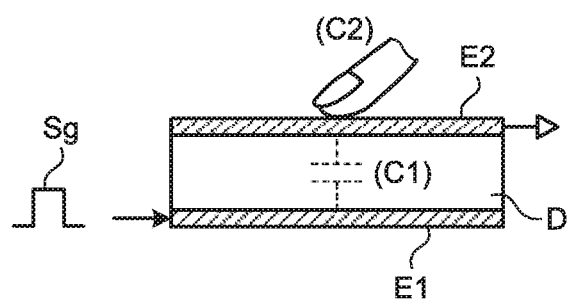
FIG. 4 is a diagram for explaining the basic principle of the capacitive type touch detection, illustrating a state in which a finger is in contact with or in proximity to a device.
Figure 5:
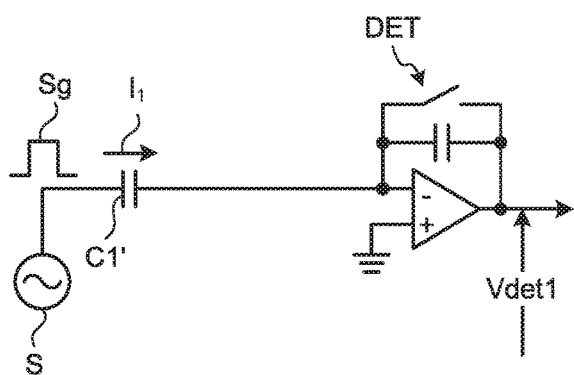
FIG. 5 is a diagram illustrating an example of an equivalent circuit in the state illustrated in FIG. 4 in which the finger is in contact with or in proximity to the device.
Figure 6:
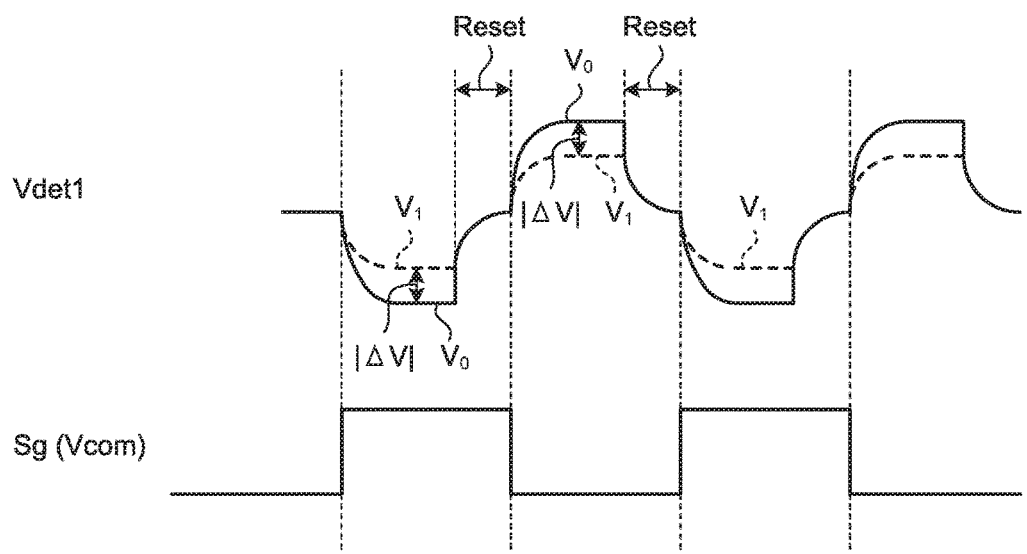
FIG. 6 is a diagram illustrating an example of waveforms of a drive signal and a detection signal.

The detection device 30 operates based on the basic principle of capacitive type proximity detection, and outputs the detection signal Vdet. The basic principle of touch detection in the display unit 10 with the touch detection function according to the first embodiment will be described with reference to FIGS. 1 to 6. FIG. 2 is a diagram for explaining the basic principle of capacitive type touch detection, illustrating a state in which a finger is neither in contact with nor in proximity to a device. FIG. 3 is a diagram illustrating an example of an equivalent circuit in the state illustrated in FIG. 2 in which the finger is neither in contact with nor in proximity to the device. FIG. 4 is a diagram for explaining the basic principle of the capacitive type touch detection, illustrating a state in which a finger is in contact with or in proximity to a device. FIG. 5 is a diagram illustrating an example of an equivalent circuit in the state illustrated in FIG. 4 in which the finger is in contact with or in proximity to the device. FIG. 6 is a diagram illustrating an example of waveforms of a drive signal and a detection signal.

For example, as illustrated in FIGS. 2 and 4, a capacitive element C1 or C1' includes a pair of electrodes, i.e., a drive electrode E1 and a detection electrode E2, arranged to face each other with a dielectric D interposed therebetween. One end of the capacitive element C1 is coupled to an AC signal source (a drive signal source) S, and the other end thereof is coupled to a voltage detector (a touch detecting unit) DET as illustrated in FIG. 3. For example, the voltage detector DET is an integration circuit included in the detection signal amplifying unit 42 illustrated in FIG. 1.

When an AC square wave Sg of a predetermined frequency (for example, about several kHz to several hundreds of kHz) is applied from the AC signal source S to the drive electrode E1 (one end of the capacitive element C1), an output waveform (a detection signal Vdet1) appears through the voltage detector DET coupled to the detection electrode E2 (the other end of the capacitive element C1) side. The AC square wave Sg corresponds to a touch drive signal Vcomt which will be described below.

In the state in which the finger is not in contact with (or in proximity to) the device (the non-contact state), electric current $I_0$ corresponding to a capacitance value of the capacitive element C1 flows in accordance with charge and discharge of the capacitive element C1, as illustrated in FIGS. 2 and 3. As illustrated in FIG. 6, the voltage detector DET converts a variation in the electric current $I_0$ corresponding to the AC square wave Sg into a variation of a voltage (a waveform $V_0$ indicated by the solid line).

On the other hand, in the state in which the finger is in contact with (or in proximity to) the device (the contact state), a capacitance C2 formed by the finger abuts on or is nearby the detection electrode E2 as illustrated in FIG. 4. Thus, the capacitance C2 blocks a capacitance corresponding to a fringe between the drive electrode E1 and the detection electrode E2, thereby providing a capacitive element C1' having a capacitance value smaller than that of the capacitive element C1. Referring to the equivalent circuit illustrated in FIG. 5, electric current $I_1$ flows through the capacitive element C1'. The voltage detector DET converts a variation in the electric current $I_1$ according to the AC square wave Sg into a variation in a voltage (waveform $V_1$ indicated by the dotted line) as illustrated in FIG. 6. In this case, the amplitude of the waveform $V_1$ is smaller than the amplitude of the waveform $V_0$. As a result, an absolute value $|\Delta V|$ of a voltage difference between the waveform $V_0$ and the waveform $V_1$ changes according to influence of an object, such as a finger, approaching the device from the outside. In order to accurately detect the absolute value $|\Delta V|$ of the voltage difference between the waveform $V_0$ and the waveform $V_1$, the voltage detector DET preferably performs an operation while having a period Reset for resetting charge and discharge of a capacitor according to the frequency of the AC square wave Sg through switching in a circuit.

The detection device 30 illustrated in FIG. 1 performs the touch detection by sequentially scanning detection blocks one by one according to the drive signal Vcom (the touch drive signal Vcomt which will be described below) supplied from the drive electrode driver 14.

In the detection device 30, the detection signal Vdet1 is output from a plurality of detection electrodes TDL to be described below through the voltage detector DET illustrated in FIG. 3 or FIG. 5 for each detection block, and is supplied to the A/D converting unit 43 of the touch detecting unit 40.

The A/D converting unit 43 is a circuit that performs sampling of each analog signal output from the detection signal amplifying unit 42 at timing in synchronization with the drive signal Vcom, and that convers the analog signal into a digital signal.

The signal processing unit 44 includes a digital filter that reduces a frequency component (a noise component) other than the frequency obtained by sampling the drive signal Vcom, which is included in an output signal from the A/D converting unit 43. The signal processing unit 44 is a logic circuit that detects whether there is a touch on the detection device 30 based on the output signal of the A/D converting unit 43. The signal processing unit 44 performs a process of extracting only a difference voltage generated by the finger. The difference voltage generated by the finger is the absolute value $|\Delta V|$ of the difference between the waveform $V_0$ and the waveform $V_1$. The signal processing unit 44 may perform a calculation for averaging the absolute values $|\Delta V|$ per detection block and obtain an average value of the absolute values $|\Delta V|$. As a result, the signal processing unit 44 can reduce influence of noise. The signal processing unit 44 compares the detected difference voltage generated by the finger with a predetermined threshold voltage. If the detected difference voltage is the threshold voltage or larger, the signal processing unit 44 determines that an external proximity object approaching from the outside is in the contact state. On the other hand, if the detected difference voltage is less than the threshold voltage, the signal processing unit 44 determines that an external proximity object is in the non-contact state. Accordingly, the touch detecting unit 40 can detect a touch.

The coordinate extracting unit 45 is a logic circuit that obtains, when the signal processing unit 44 has detected a touch, the touch panel coordinates of the touch. The detection timing control unit 46 performs control such that the A/D converting unit 43, the signal processing unit 44, and the coordinate extracting unit 45 operate in synchronization with one another. The coordinate extracting unit 45 outputs the touch panel coordinates as a signal output Vout.

Figure 7:
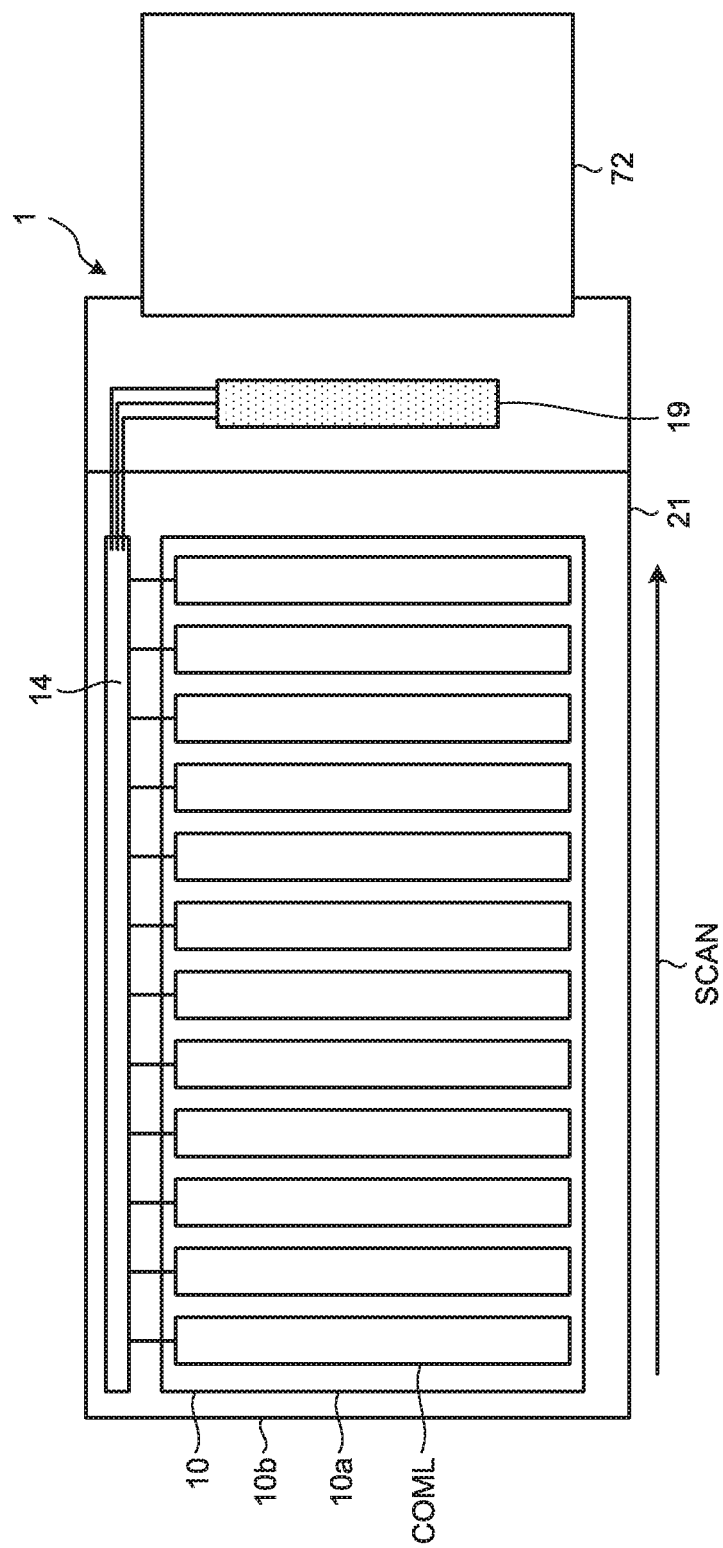
FIG. 7 is a diagram illustrating an example of a module on which a display device with a touch detection function is mounted.
Figure 8:
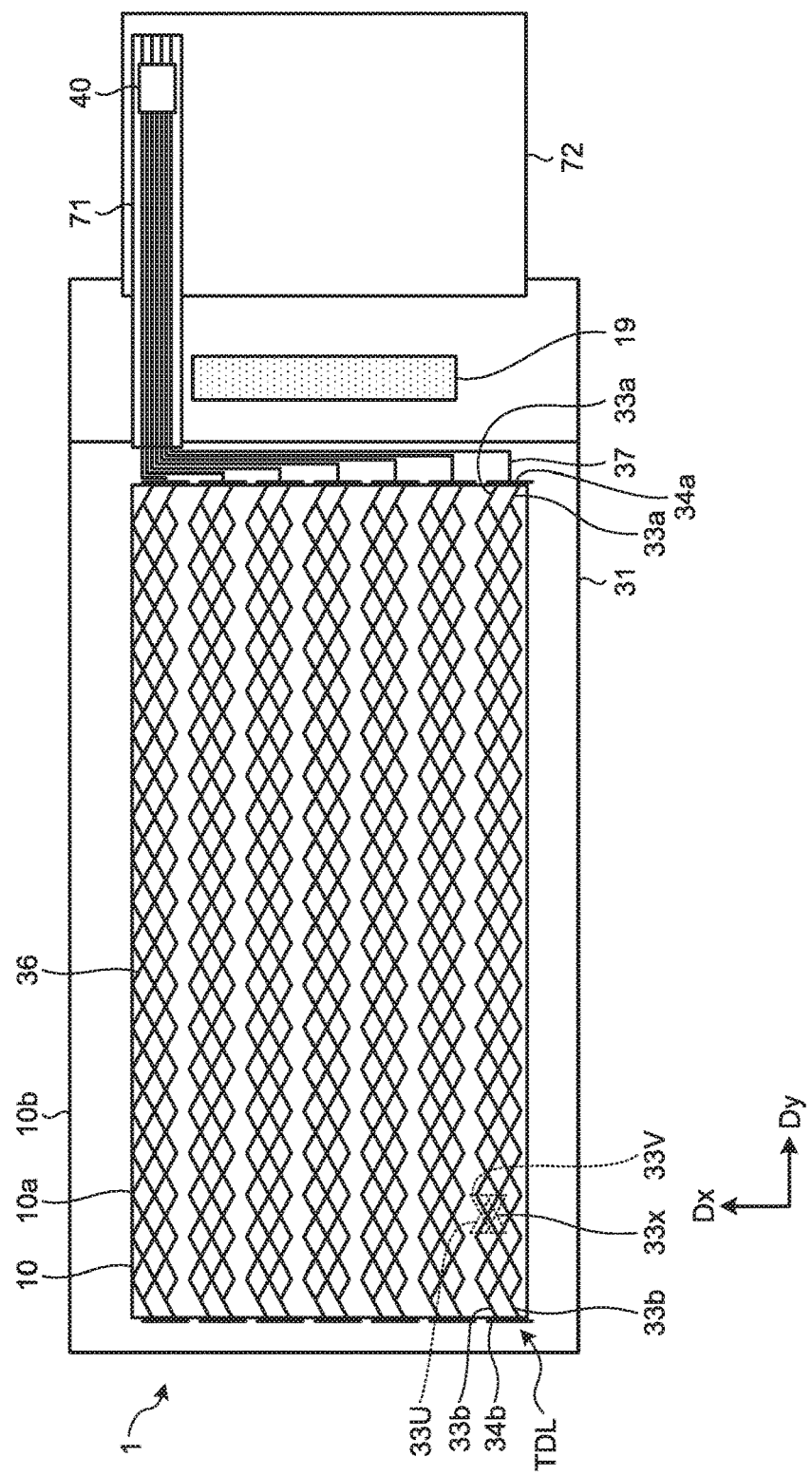
FIG. 8 is a diagram illustrating an example of a module on which a display device with a touch detection function is mounted.

FIGS. 7 and 8 are plane views each illustrating an example of a module on which the display device with the touch detection function is mounted according to the first embodiment. FIG. 7 is a plane view illustrating an example of the drive electrode, and FIG. 8 is a plane view illustrating an example of the detection electrode.

As illustrated in FIG. 7, the display device 1 with the touch detection function includes a thin film transistor (TFT) substrate 21 and a flexible printed circuit board 72. On the TFT substrate 21, a chip on glass (COG) 19 is mounted, and regions corresponding to a display region 10a of the display device 20 (see FIG. 1) and a frame region 10b surrounding the display region 10a are formed. The COG 19 is an IC driver chip mounted on the TFT substrate 21 and includes built-in circuits necessary for a display operation such as the control unit 11, the gate driver 12, and the source driver 13 illustrated in FIG. 1. In the present embodiment, the drive electrode driver 14 may be formed on the TFT substrate 21 that is a glass substrate. The COG 19 and the drive electrode driver 14 are disposed on the frame region 10b. The COG 19 may incorporate the drive electrode driver 14. In this case, the frame region 10b can be narrowed. The flexible printed circuit board 72 is coupled with the COG 19, and the video signal Vdisp and a power voltage are supplied from the outside to the COG 19 via the flexible printed circuit board 72.

As illustrated in FIG. 7, in the display unit 10 with the touch detection function, a plurality of drive electrodes COML are formed on a region overlapping the display region 10a. The drive electrodes COML extend in a direction along one side of the display region 10a and are arranged with intervals in a direction along the other side of the display region 10a. The drive electrodes COML are coupled to the drive electrode driver 14.

As illustrated in FIG. 8, the display device 1 with the touch detection function further includes a substrate 31 and a flexible printed circuit board 71. The touch detecting unit 40 described above is mounted on the flexible printed circuit board 71. The touch detecting unit 40 may not be mounted on the flexible printed circuit board 71 and may be mounted on another substrate coupled with the flexible printed circuit board 71. For example, the substrate 31 is a transparent glass substrate and faces the TFT substrate 21 in a direction perpendicular to the surface of the TFT substrate 21 illustrated in FIG. 7. In the display unit 10 with the touch detection function, the detection electrodes TDL are formed on a region overlapping the display region 10a as illustrated in FIG. 8. The detection electrodes TDL extend in a direction intersecting with the extending direction of the drive electrodes COML illustrated in FIG. 7. The detection electrodes TDL are arranged with intervals in the extending direction of the drive electrodes COML. In other words, the drive electrodes COML and the detection electrodes TDL are arranged to three-dimensionally intersect with each other, and a capacitance is formed in portions where the drive electrodes COML and the detection electrodes TDL overlap with each other.

The display device 1 with the touch detection function sequentially scans the horizontal lines one by one when the display operation is performed as will be described below. In other words, the display device 1 with the touch detection function performs the display scanning in parallel to a direction along one side of the display unit 10 with the touch detection function (see FIG. 8). On the other hand, when the touch detection operation is performed, the display device 1 with the touch detection function sequentially applies the drive signals Vcom from the drive electrode driver 14 to the drive electrodes COML and sequentially scans the detection lines one by one. In other words, the display unit 10 with the touch detection function performs scanning in a direction SCAN that is parallel to a direction along the other side of the display unit 10 with the touch detection function (see FIG. 7).

As illustrated in FIG. 8, the detection electrode TDL according to the present embodiment includes a plurality of conductive thin wires 33U and 33V. The conductive thin wires 33U and 33V are inclined in mutually opposite directions with respect to a direction parallel to one side of the display region 10a.

The conductive thin wires 33U and 33V have a narrow width and are arranged with intervals in a direction (a short side direction of the display region 10a) intersecting with an extending direction of the conductive thin wires 33U and 33V in the display region 10a. The both ends of one detection electrode TDL in the extending direction are respectively coupled to coupling wires 34a and 34b arranged in the frame region 10b. Thus, the conductive thin wires 33U and 33V are electrically coupled with each other, and function as one detection electrode TDL. The coupling wires 34a are coupled to respective wires 37, and the detection electrodes TDL are coupled with the flexible printed circuit board 71 through the wires 37. Some of the detection electrodes TDL may be arranged outside the display region 10a (in the frame region 10b). The coupling wires 34a and 34b may be arranged in the display region 10a outside the frame region 10b. The coupling wires 34a and 34b are coupled with the touch detecting unit 40 via the wires 37, and may serve as wires for coupling the conductive thin wires 33U and 33V with the touch detecting unit 40.

Figure 9:
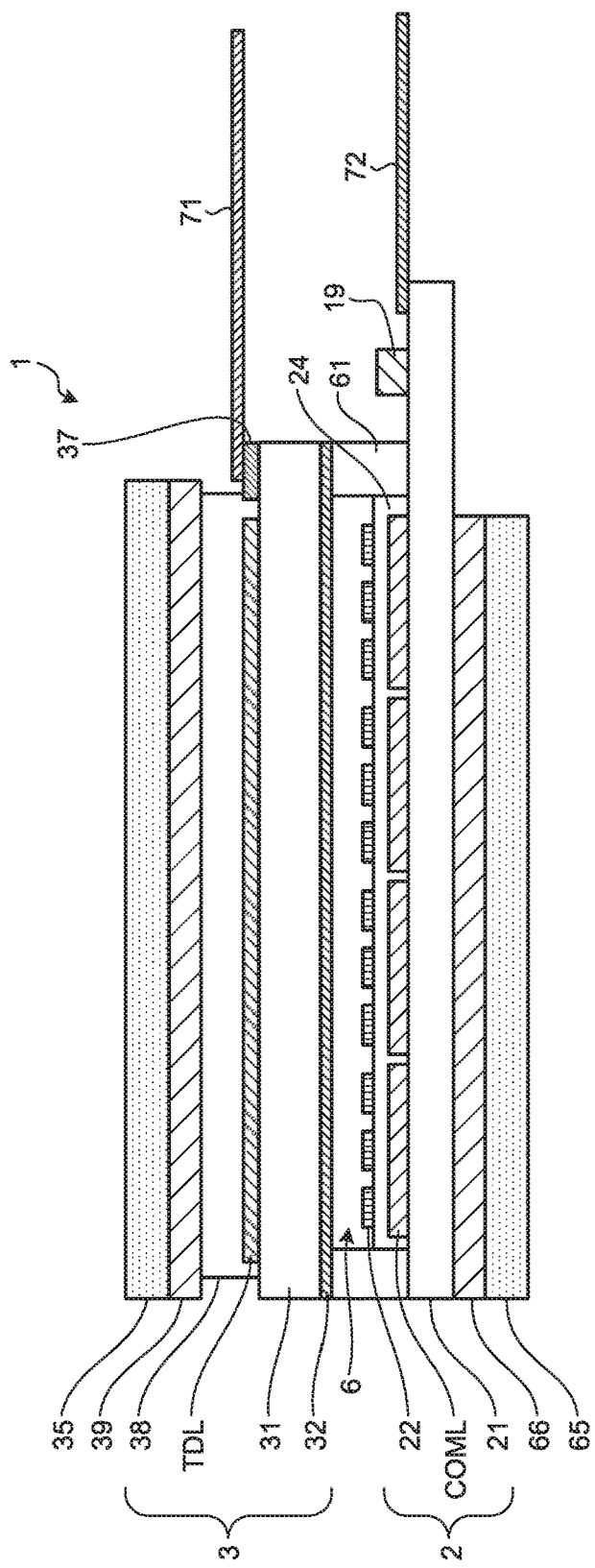
FIG. 9 is a cross-sectional view illustrating a schematic cross-sectional structure of the display device with the touch detection function according to the first embodiment.

FIG. 9 is a cross-sectional view illustrating a schematic cross-sectional structure of the display device with the touch detection function. As illustrated in FIG. 9, the display unit 10 with the touch detection function includes a pixel substrate 2, a counter substrate 3 that is arranged to face the pixel substrate 2 in a direction perpendicular to the surface of the pixel substrate 2, and a liquid crystal layer 6 that is interposed between the pixel substrate 2 and the counter substrate 3.

The pixel substrate 2 includes the TFT substrate 21 serving as a circuit substrate, a plurality of pixel electrodes 22 arranged above the TFT substrate 21 in a matrix form, a plurality of drive electrodes COML formed between the TFT substrate 21 and the pixel electrodes 22, and an insulation layer 24 for insulating the pixel electrodes 22 from the drive electrodes COML. A polarizing plate 65 is disposed below the TFT substrate 21 with an adhesive layer 66 interposed therebetween.

The counter substrate 3 includes a substrate 31 and a color filter 32 formed on one surface of the substrate 31. The detection electrodes TDL serving as the detection electrodes of the detection device 30 are formed on the other surface of the substrate 31. The detection electrodes TDL are formed on the substrate 31 as illustrated in FIG. 9. Further, a protective layer 38 for protecting the conductive thin wires 33U and 33V is formed on the detection electrodes TDL. The protective layer 38 may be formed of transparent resin such as acrylic resin. A polarizing plate 35 is disposed above the protective layer 38 with an adhesive layer 39 interposed therebetween.

The TFT substrate 21 and the substrate 31 are arranged to face each other with a predetermined interval by a spacer 61. The liquid crystal layer 6 is disposed in a space surrounded by the TFT substrate 21, the substrate 31, and the spacer 61. The liquid crystal layer 6 modulates light passing through the liquid crystal layer 6 according to the state of an electric field, and a display panel that is employed uses a liquid crystal of a horizontal field mode such as in-plane switching (IPS) including fringe field switching (FFS). An orientation film may be disposed between the liquid crystal layer 6 and the pixel substrate 2 and between the liquid crystal layer 6 and the counter substrate 3 illustrated in FIG. 9.

Figure 10:
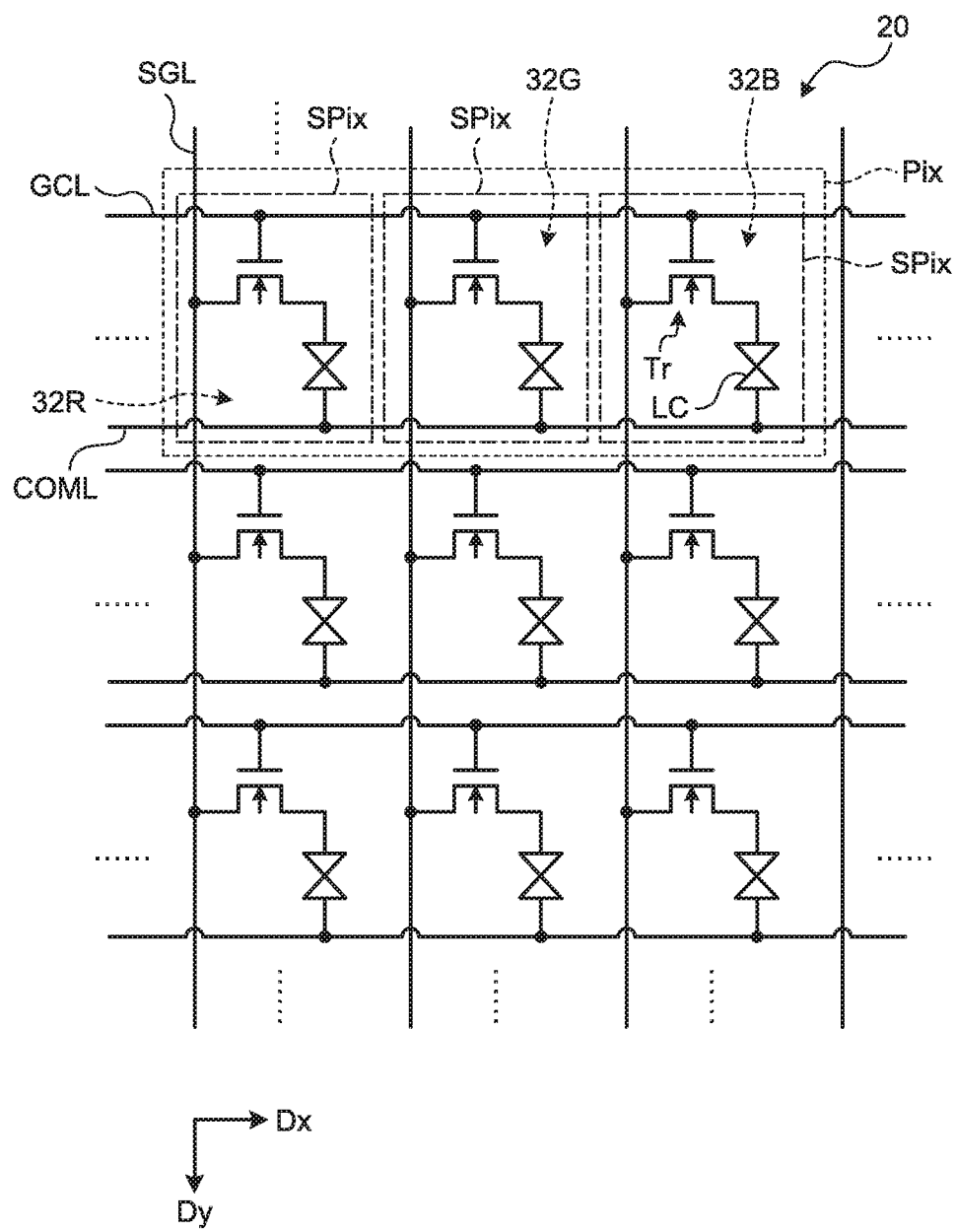
FIG. 10 is a circuit diagram illustrating a pixel array of the display device with the touch detection function according to the first embodiment.

FIG. 10 is a circuit diagram illustrating a pixel array of the display unit with the touch detection function according to the first embodiment. TFT elements Tr of the respective sub pixels SPix, and wiring such as pixel signal lines SGL for supplying the pixel signals Vpix to the pixel electrodes 22, and scanning signal lines GCL for driving the TFT elements Tr, which are illustrated in FIG. 10, are formed on the TFT substrate 21 illustrated in FIG. 9. The pixel signal line SGL and the scanning signal line GCL extend on a plane parallel to the surface of the TFT substrate 21. A direction (an extending direction of the scanning signal line GCL) which is orthogonal to an arrangement direction of the sub pixels SPix illustrated in FIG. 10 is referred to as a direction Dx, and the arrangement direction of the sub pixels SPix (an extending direction of the pixel signal line SGL) is referred to as a direction Dy.

The display device 20 illustrated in FIG. 10 includes the sub pixels SPix arranged in a matrix form. Each of the sub pixels SPix includes the TFT element Tr and a liquid crystal element LC. The TFT element Tr includes a thin film transistor, in this example, an n-channel metal oxide semiconductor (MOS) TFT. One of the source and the drain of the TFT element Tr is coupled to the pixel signal line SGL, the gate thereof is coupled to the scanning signal line GCL, and the other of the source and the drain is coupled to one end of the liquid crystal element LC. One end of the liquid crystal element LC is coupled to the other of the source and the drain of the TFT element Tr, and the other end of the liquid crystal element LC is coupled to the drive electrode COML.

The sub pixel SPix is coupled with the other sub pixels SPix belonging to the same row of the display device 20 through the scanning signal line GCL. The scanning signal line GCL is coupled with the gate driver 12 (see FIG. 1), and the scanning signal Vscan is supplied from the gate driver 12. The sub pixel SPix is coupled with the other sub pixels SPix belonging to the same column of the display device 20 through the pixel signal line SGL. The pixel signal line SGL is coupled with the source driver 13 (see FIG. 1), and the pixel signal Vpix is supplied from the source driver 13. Further, the sub pixel SPix is coupled with the other sub pixels SPix belonging to the same row through the drive electrode COML. The drive electrode COML is coupled with the drive electrode driver 14 (see FIG. 1), and the drive signal Vcom is supplied from the drive electrode driver 14. In other words, in this example, the sub pixels SPix belonging to the same row share one drive electrode COML. The extending direction of the drive electrode COML according to the present embodiment is parallel to the extending direction of the scanning signal line GCL. The extending direction of the drive electrode COML according to the present embodiment is not limited thereto. For example, the extending direction of the drive electrode COML may be a direction parallel to the extending direction of the pixel signal line SGL.

The gate driver 12 illustrated in FIG. 1 performs driving to sequentially scan the scanning signal lines GCL. The scanning signal Vscan (see FIG. 1) is applied to the gate of the TFT element Tr of the sub pixel SPix through the scanning signal line GCL, and one horizontal line of the sub pixels SPix are sequentially selected as display driving targets. In the display device 1 with the touch detection function, the source driver 13 supplies the pixel signal Vpix to the sub pixels SPix belonging to one horizontal line, thereby performing display for each horizontal line. When the display operation is performed, the drive electrode driver 14 applies the drive signal Vcom to the drive electrode COML corresponding to the horizontal line.

In the color filter 32 illustrated in FIG. 9, for example, color regions 32R, 32G, and 32B of color filters colored in three colors of red (R), green (G), and blue (B) are periodically arranged. The color regions 32R, 32G, and 32B of three colors of R, G, and B are associated with the respective sub pixels SPix illustrated in FIG. 10, and a pixel Pix is constituted of a set of the color regions 32R, 32G, and 32B. The color filter 32 faces the liquid crystal layer 6 in a direction perpendicular to the TFT substrate 21 as illustrated in FIG. 9. The color filter 32 may be colored in any combination of other colors different from each other. The color filter 32 is not limited to a combination of three colors or may be a combination of four colors or more.

Figure 11:
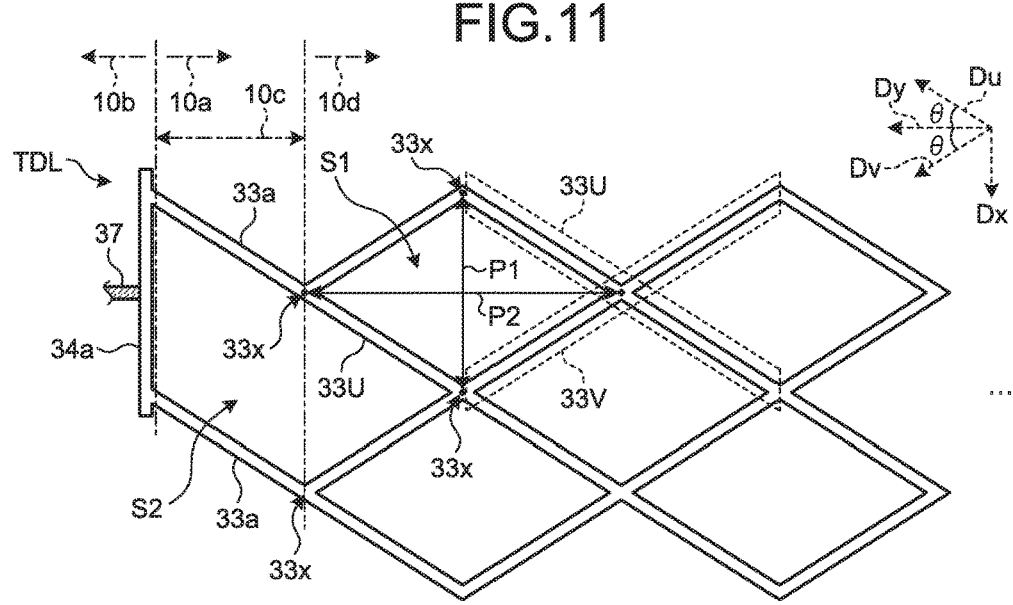
FIG. 11 is a plane view illustrating a detection electrode according to the first embodiment.

FIG. 11 is a plane view illustrating the detection electrode according to the first embodiment. Each of the conductive thin wires 33U and 33V is formed of one or more types of metallic layers selected from aluminum (Al), copper (Cu), argentum (Ag), molybdenum (Mo), chromium (Cr) and tungsten (W). Alternatively, each of the conductive thin wires 33U and 33V is formed of an alloy of one or more types of metallic materials selected from aluminum (Al), copper (Cu), argentum (Ag), molybdenum (Mo), chromium (Cr) and tungsten (W). Further, each of the conductive thin wires 33U and 33V may be a stacked body in which a plurality of conductive layers made of one or more types of metallic materials selected from aluminum (Al), copper (Cu), argentum (Ag), molybdenum (Mo), chromium (Cr) and tungsten (W) or made of an alloy of one or more types of the materials. Furthermore, each of the conductive thin wires 33U and 33V may be configured such that a conductive layer of a transparent conductive oxide such as ITO is stacked in addition to the conductive layers of the metallic materials or an alloy of the metallic materials.

The metallic materials described above have lower resistance than the transparent conductive oxide such as ITO as a material of the transparent electrode. Since the metallic materials described above have light shielding effect compared to the transparent conductive oxide. Therefore, there is a possibility that transmissivity is lowered, or a pattern of the detection electrodes TDL is visually recognized. In the present embodiment, one detection electrode TDL includes the conductive thin wires 33U and 33V having a narrow width, and adjacent conductive thin wires 33U are arranged with an interval in a direction Du, and adjacent conductive thin wires 33V are arranged with an interval in a direction Dv, each of the intervals being larger than a line width of the conductive thin wires 33U and 33V. Thus, low resistance and invisibility can be realized. As a result, it is possible to lower resistance in the detection electrodes TDL, and make the display device 1 with the touch detection function thinner, have a large screen, or achieve a high resolution.

It is preferable that each of the conductive thin wires 33U and 33V has a width in the range of 2 μm to 10 μm. This is because, when each of the conductive thin wires 33U and 33V has a width of 10 μm or less, such a configuration decreases the area of a black matrix in the display region 10a or the area covering an opening that is a region in which transmission of light is not suppressed through the scanning signal lines GCL and the pixel signal lines SGL which will be described below, and thus lowers a possibility that an aperture ratio is reduced. This is also because when each of the conductive thin wires 33U and 33V has a width of 2 μm or more, the shape of wiring is stabilized, and a possibility of disconnection is lowered.

Referring to FIGS. 8, 10, and 11, in the detection electrode TDL, the conductive thin wires 33U and 33V are arranged with predetermined pitches, and the detection electrode TDL extends in a direction parallel to the extending direction of the color regions 32R, 32G, and 32B of the color filter 32 as a whole. In other words, the detection electrode TDL extends in a direction parallel to the direction Dy in which the pixel signal line SGL illustrated in FIG. 10 extends. The conductive thin wires 33U and 33V are configured to have a mesh-like shape such that thin wire segments inclined in mutually opposite directions intersect with each other and are coupled with each other, thereby preventing a specific color region of the color filter 32 from being blocked by the conductive thin wires 33U and 33V. The conductive thin wires 33U and 33V are respectively inclined in the direction Du and the direction Dv which are opposite to each other, and have an angle θ with respect to the direction parallel to the extending direction of the color regions 32R, 32G, and 32B. Electrical coupling portions 33x and 33x are formed at positions where the conductive thin wires 33U and 33V intersect with each other or are bent, and are coupled with each other. The conductive thin wires 33U and 33V intersect with each other at a plurality of electrical coupling portions 33x. For example, the angle θ is 5° to 75°, preferably 25° to 40°, and more preferably 50° to 65°.

As described above, the detection electrode TDL includes at least one first conductive thin wire 33U extending in the direction Du and at least one second conductive thin wire 33V intersecting with the first conductive thin wire 33U and extending in the direction Dv. When the first conductive thin wires 33U intersect with the respective second conductive thin wires 33V, the shape of a region surrounded by a single mesh of the detection electrode TDL is a parallelogram. In FIG. 11, lengths of diagonal lines of the shape of the region surrounded by a single mesh of the detection electrode TDL are P1 and P2.

In the present embodiment, when the electrical coupling portions 33x and 33x closest to the coupling wire 34a are regarded as a boundary, a region, at a side closer to the coupling wire 34a than the electrical coupling portions 33x and 33x closest to the coupling wire 34a, and ranging from the electrical coupling portions 33x and 33x closest to the coupling wire 34a to the coupling wire 34a, is an end region 10c of the detection electrode TDL. Similarly, a region that is at a side farther from the coupling wire 34a than the electrical coupling portions 33x and 33x closest to the coupling wire 34a is a main detection region 10d of the detection electrode TDL.

The pattern of the detection electrode around the coupling wire 34a and the pattern of the detection electrode around the coupling wire 34b are line-symmetric as illustrated in FIG. 8, or point-symmetric. Therefore, when the electrical coupling portions 33x and 33x closest to the coupling wire 34b are regarded as a boundary, a region, at a side closer to the coupling wire 34b than the electrical coupling portions 33x and 33x closest to the coupling wire 34b, and ranging from the electrical coupling portions 33x and 33x closest to the coupling wire 34b to the coupling wire 34b, is an end region of the detection electrode TDL. Similarly, a region that is at a side farther from the coupling wire 34b than the electrical coupling portions 33x and 33x closest to the coupling wire 34b is a main detection region of the detection electrode TDL.

As illustrated in FIG. 11, in the end region 10c of the detection electrode TDL, a conductive thin wire 33a is arranged at a position to which the conductive thin wire 33U extends, and the coupling wire 34a is electrically coupled with the conductive thin wire 33U in the main detection region 10d through the conductive thin wire 33a.

As described above, the extending direction of the conductive thin wires 33U and 33V of the detection electrode TDL has the angle θ with respect to the extending direction of the color regions 32R, 32G, and 32B of the color filter 32. As a result, a light shielding amount of each of the color regions 32R, 32G, and 32B of the color filter 32 is averaged, and thus a decrease in transmissivity in a specific color region of the color filter 32 is suppressed. The conductive thin wires 33U and 33V of the detection electrode TDL may be arranged to have a variation in intervals within a desirable range. In other words, in the detection electrode TDL, intervals between the conductive thin wires 33U and 33V may be different.

The drive electrodes COML illustrated in FIGS. 7 and 9 function as common electrodes that apply a common potential to a plurality of pixel electrodes 22 of the display device 20 and function as drive electrodes used when mutual capacitive type touch detection is performed by the detection device 30. The detection device 30 is configured with the drive electrodes COML disposed on the pixel substrate 2 and the detection electrodes TDL disposed on the counter substrate 3.

The drive electrodes COML are configured by a plurality of electrode patterns extending in a direction parallel to the other side of the display region 10a illustrated in FIG. 7. The detection electrodes TDL are configured by a plurality of electrode patterns including a plurality of metallic wires extending in a direction intersecting with the extending direction of the electrode patterns of the drive electrodes COML. The detection electrodes TDL face the drive electrodes COML in a direction perpendicular to the surface of the TFT substrate 21 (see FIG. 9). The electrode patterns of the detection electrodes TDL are coupled to input terminals of the detection signal amplifying unit 42 of the touch detecting unit 40 (see FIG. 1). In the electrode patterns in which the drive electrodes COML intersect with the detection electrodes TDL, a capacitance is formed in the intersections.

The drive electrodes COML are made of, for example, a translucent conductive material such as ITO. The shapes of the detection electrodes TDL and the drive electrodes COML (the drive electrode block) are not limited to a stripe-shape, i.e., a shape divided into a plurality of portions. For example, the detection electrodes TDL and the drive electrodes COML may have a comb-teeth shape. Alternatively, any shape can be employed for the detection electrodes TDL and the drive electrodes COML, as long as being divided into two or more portions. In this case, the shape of slits dividing the drive electrodes COML may be a straight line or a curved line.

With this configuration, in the detection device 30, when the mutual capacitive type touch detection operation is performed, the drive electrode driver 14 performs driving to sequentially scan drive electrode blocks of the drive electrodes COML in a time division manner, thereby sequentially selecting one detection block of the drive electrodes COML. Then, the touch detection electrodes TDL output the detection signal Vdet1, thereby performing touch detection of the one detection block. In other words, the drive electrode block corresponds to the drive electrode E1 in the basic principle of the mutual capacitive type touch detection, and the detection electrode TDL corresponds to the detection electrode E2. The detection device 30 detects a touch input according to the basic principle. The detection electrodes TDL and the drive electrodes COML three-dimensionally interesting with each other include capacitive touch sensors in a matrix form. Thus, the position of contact or proximity of an external conductor can be detected by scanning the entire touch detection surface of the detection device 30.

As an example of an operation method of the display device 1 with the touch detection function, the display device 1 with the touch detection function performs the touch detection operation (in a detection period) and the display operation (in a display operation period) in a time division manner. The touch detection operation and the display operation may be performed by any manner of arranging the touch detection period and the display operation period.

In the present embodiment, since the drive electrode COML also serves as the common electrode of the display device 20, in the display operation period, the control unit 11 supplies the drive signal Vcom serving as a common electrode potential for display to the drive electrode COML selected through the drive electrode driver 14.

When the detection operation is performed only through the detection electrodes TDL without using the drive electrodes COML in the detection period, for example, when touch detection is performed based on the basic principle of the self-capacitive type touch detection which will be described below, the drive electrode driver 14 may supply the drive signal Vcom for the touch detection to the detection electrodes TDL.

Figure 12:
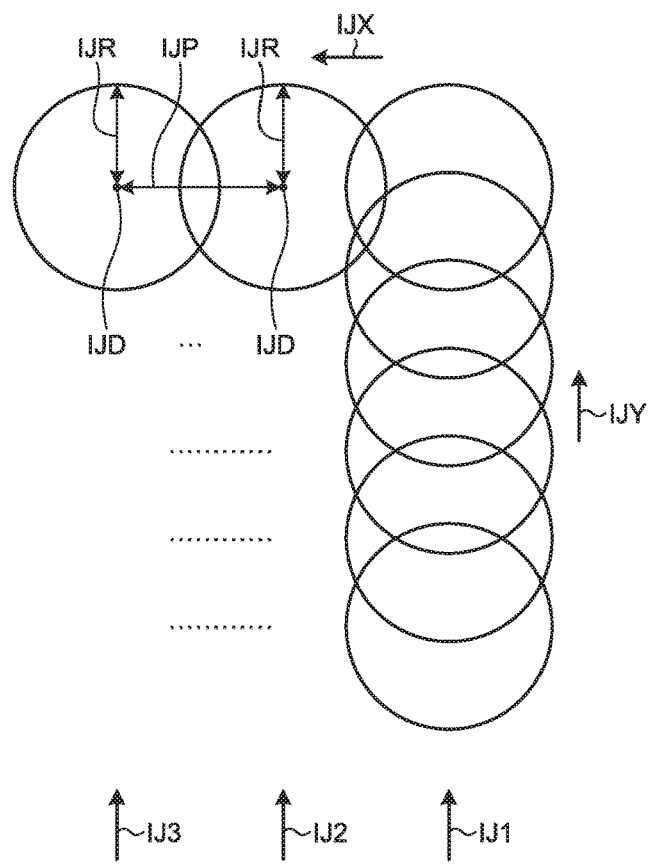
FIG. 12 is a process diagram for explaining a process of applying a protective layer in a method of manufacturing the detection device according to the first embodiment.
Figure 13:
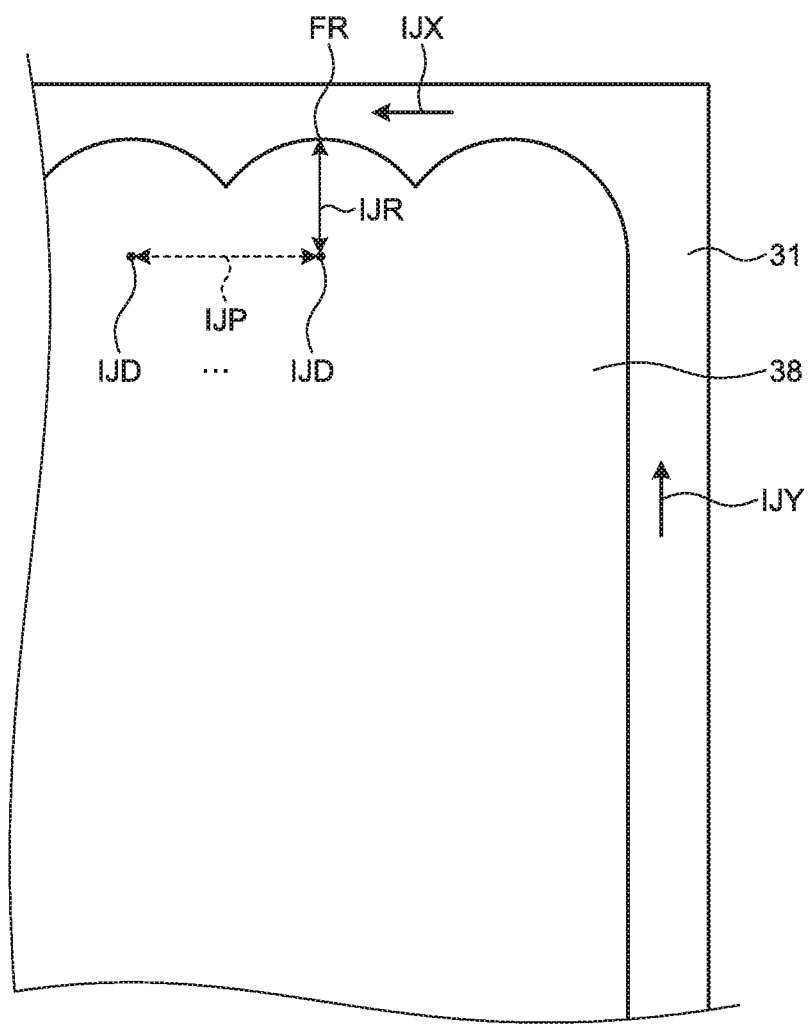
FIG. 13 is a top view illustrating a protective layer.

FIG. 12 is a process diagram for explaining a process of applying the protective layer in a method of manufacturing the detection device according to the first embodiment. FIG. 13 is a top view illustrating the protective layer.

(Method of Manufacturing Detection Device According to First Embodiment)

As illustrated in FIG. 9, a conductive layer is formed on the substrate 31 using one or more types of metallic materials selected from aluminum (Al), copper (Cu), argentum (Ag), molybdenum (Mo), chromium (Cr), and tungsten (W). The conductive layer may be consecutively formed in one process using a sputtering technique, a chemical vapor deposition (CVD) technique, or the like.

Next, a resist is formed on the conductive layer. The resist is patterned by photolithography and formed at a position overlapping the patterns of the conductive thin wires 33U and 33V illustrated in FIG. 8.

Thereafter, a portion of the conductive layer exposed from the resist is removed by etching. A portion of the conductive layer overlapping the resist is not removed by etching and formed as the patterns of the conductive thin wires 33U and 33V. An etchant for the conductive layer may be selected according to a metal type. For example, when the portion of the conductive layer exposed from the resist is an Al-based film, a phosphoric acid-based etchant such as a mixed liquid of phosphoric acid, nitric acid, and acetic acid is used as the etchant for the conductive layer. When the portion of the conductive layer exposed from the resist is a Cu-based film, ferric chloride is used.

Then, the conductive thin wires 33U and 33V are patterned and formed by removing the resist. Accordingly, the detection electrodes TDL including the conductive thin wires 33U and 33V illustrated in FIG. 8 are formed.

Then, application liquid of an insulation material, which will serve as the protective layer 38, is applied to cover the conductive thin wires 33U and 33V. The insulation material serving as the protective layer 38 is acrylic resin, epoxy resin, or polyimide resin. The insulation material serving as the protective layer 38 is UV curable resin that is polymerization-cured in a short time by energy of UV light irradiated from a UV irradiation apparatus. Alternatively, the insulation material serving as the protective layer 38 is thermosetting resin that is cured in a short time by thermal energy transferred from a heating apparatus such as a hot plate device or an oven. As the insulation material serving as the protective layer 38, a combination type of the UV curable resin and the thermosetting resin may be used. The insulation material serving as the protective layer 38 may be a high resistance material, and sheet resistance of the insulation material serving as the protective layer 38 is preferably higher by three digits or more than that of the conductive layer. For example, the sheet resistance of the insulation material serving as the protective layer 38 may be $10^6 \Omega/\square$ or more.

The conductive thin wires 33U and 33V have fine conductor patterns. When micro droplets of the insulation material serving as the protection layer 38 are applied on the conductive thin wires 33U and 33V, influence by the thicknesses of the conductive thin wires 33U and 33V and influence by the distributions of the conductive thin wires 33U and 33V are suppressed, and uniformity of the thickness of the protective layer 38 is improved.

Micro droplets dropped by a droplet ejecting apparatus using an ink jet method, an electric field jet method, or the like are usually dropped from nozzles at the same time. For example, as illustrated in FIG. 12, the droplets dropped by the droplet ejecting apparatus are simultaneously ejected along dropping columns IJ1, IJ2, and IJ3. It is possible to cause the droplets to densely overlap with one another by delaying the moving speed of the nozzles in a moving direction IJY of the nozzles. However, since a dropping pitch IJP of the droplets is determined by a pitch of ejection holes of the nozzles, an ejection position IJD of each of the droplets is determined according to the dropping pitch IJP of the droplets in a direction IJX intersecting with the moving direction IJY of the nozzle. The droplet dropped at the ejection position IJD concentrically spreads centering on the ejection position IJD of the droplet with a radius IJR. The droplets overlap with one another according to the ejection positions IJD and an ejection amount of the droplets in the direction IJX intersecting with the moving direction IJY of the nozzle. For example, the dropping pitch IJP is 10 μm to 100 μm.

Then, the insulation material is cured by UV light irradiated from the UV light irradiation apparatus or heating from the heating apparatus to form the protective layer 38. As illustrated in FIG. 13, convex portions FR having a curved surface are continuously formed in the direction IJX intersecting with the moving direction IJY of the nozzle on the edge of the protective layer 38 of the moving direction IJY of the nozzle, and thus form a concavo-convex portion in a planar view. The center of curvature can be calculated from the curvature of the convex portion FR and this center of curvature is regarded as the ejection position IJD of the droplet. As a result, it is possible to estimate the radius IJR as an estimation radius with which the droplet spreads from the curved surface of the outer edge of the convex portion FR and the ejection position IJD of the droplet.

Figure 14:
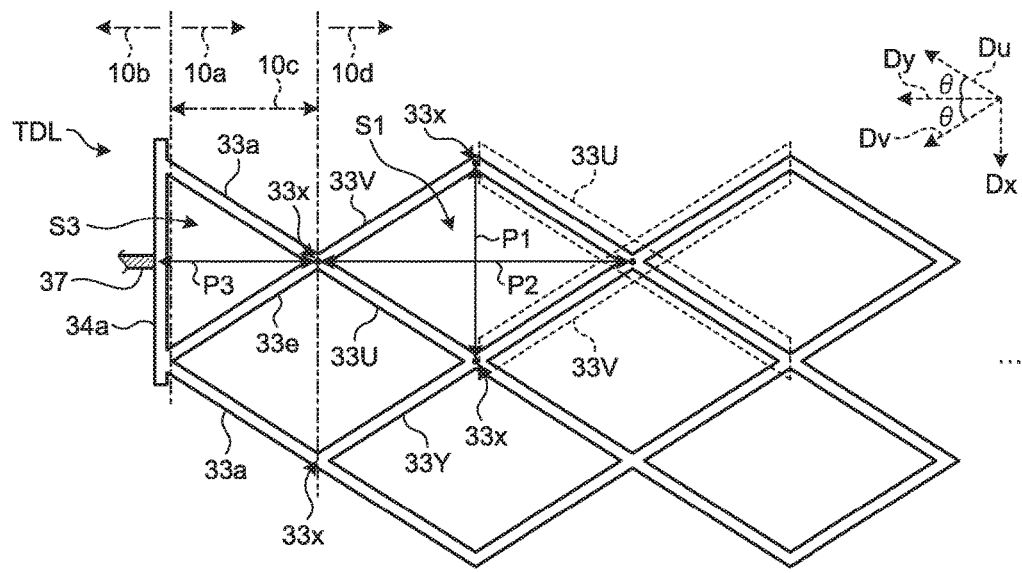
FIG. 14 is a schematic diagram for explaining wiring for coupling a plurality of conductive thin wires at an end portion of a detection electrode according to a comparative example.

FIG. 14 is a schematic diagram for explaining wiring for coupling a plurality of conductive thin wires at an end portion of a detection electrode according to a comparative example. The same components as those described in FIG. 11 are denoted by the same reference numerals, and an overlapping description is omitted. In the detection electrode illustrated in FIG. 14, as compared with the detection electrode illustrated in FIG. 11 according to the first embodiment, a conductive thin wire 33e is arranged on an extended line of a conductive thin wire 33V in the end region 10c of the detection electrode TDL.

As illustrated in FIG. 14, the area densities per unit area of the conductive thin wires 33U and 33V are the same in both the entire main detection region 10d of the detection electrode TDL and the end region 10c of the detection electrode TDL coupled to the coupling wire 34a.

An area S3 surrounded by the coupling wire 34a (or the coupling wire 34b) and the conductive thin wires 33a and 33e can be obtained by the following Expression (1). A distance between the electrical coupling portions 33x and 33x arranged in the direction Dx is a distance P1. A distance between the electrical coupling portions 33x and 33x arranged in the direction Dy is a distance P2. The shortest distance between the electrical coupling portion 33x closest to the coupling wire 34a and the coupling wire 34a is a distance P3.

$$S3 = P1 \times P3 \times \frac{1}{2} \quad (1)$$

An area S1 surrounded by a single mesh of the detection electrode TDL is obtained by the following Expression (2).

$$S1 = P1 \times P2 \quad (2)$$

The area S1 and the area S3 have a relation of Expression (3) from Expressions (1) and (2).

$$S1 = 2 \times S3 \quad (3)$$

In this way, the area S3 is smaller than the area S1. Accordingly, a probability is increased that the micro droplets of the insulation material serving as the protective layer 38 do not drop in the area S3. As a result, an air bubble may remain in the space surrounded by the coupling wire 34a (or the coupling wire 34b) and the conductive thin wires 33a and 33e.

As described above, when the insulation material serving as the protective layer 38 is applied as the micro droplets, the material exhibits a property of concentrically spreading. When the micro droplets come into contact with the conductive thin wires 33U and 33V and the coupling wire 34a (or the coupling wire 34b), the micro droplets spread along the conductive thin wires 33U and 33V and the coupling wire 34a (or the coupling wire 34b). When the area S3 is smaller than the area S1, the thickness of the insulation material serving as the protective layer 38 is more greater in the space surrounded by the coupling wire 34a (or the coupling wire 34b) and the conductive thin wires 33a and 33e than in the space surrounded by a single mesh of the detection electrode TDL. For this reason, the coupling wire 34a (or the coupling wire 34b) acts like a dam, and the coupling wire 34a (or the coupling wire 34b) may affect flatness of the protective layer 38 in the end region 10c of the detection electrode TDL.

On the other hand, in the detection electrode TDL illustrated in FIG. 11 according to the first embodiment, the area densities per unit area of the conductive thin wires 33U and 33V are smaller in the end region 10c of the detection electrode TDL coupled to the coupling wire 34a than in the entire main detection region 10d of the detection electrode TDL. As a result, the area density of the conductive thin wire per unit area is smaller in the end region 10c coupled to the coupling wire 34a (or the coupling wire 34b) than in the entire detection electrode TDL.

In the detection electrode TDL illustrated in FIG. 11 according to the first embodiment, there is no conductive thin wire 33e illustrated in FIG. 14. An area S2 surrounded by the coupling wire 34a (or the coupling wire 34b) and the conductive thin wires 33a, 33a, 33U, and 33V can be obtained by the following Expression (4). For example, the distance P1 is 100 μm to 250 μm. The distance P2 is 100 μm to 550 μm.

$$S2 = P1 \times P3 \times \frac{1}{2} + P1 \times P2 \quad (4)$$

The area S1 and the area S2 have a relation of Expression (5) from Expressions (2) and (4).

$$S2 = P1 \times P3 \times \frac{1}{2} + S1 \quad (5)$$

Thus, the area S2 is larger than the area S1. In the detection electrode TDL according to the first embodiment, the area S1 is larger than an area obtained by multiplying the square of the radius IJR serving as the estimation radius estimated from the concavo-convex portion of the edge of the protective layer 38 by the circumference ratio. Thus, the area S2 is larger than an area obtained by multiplying the square of the radius IJR by the circumference ratio. Accordingly, a probability that the micro droplets of the insulation material serving as the protective layer 38 drop in the area S2 is higher than in the area S1. As a result, a possibility is reduced that an air bubble remains in the space surrounded by the coupling wire 34a (or the coupling wire 34b) and the conductive thin wires 33a, 33a, 33U, and 33V.

When the area S2 is larger than the area S1, the thickness of the insulation material serving as the protective layer 38 is greater in the space surrounded by a single mesh of the detection electrode TDL than in the space surrounded by the coupling wire 34a (or the coupling wire 34b) and the conductive thin wires 33a, 33U, and 33V. An area of the mesh of the detection electrode TDL (the area of the main detection region 10d) is larger than the end region 10c in the entire detection electrode TDL, and thus the flatness of the protective layer 38 is less influenced.

First Modification of First Embodiment

Figure 15:
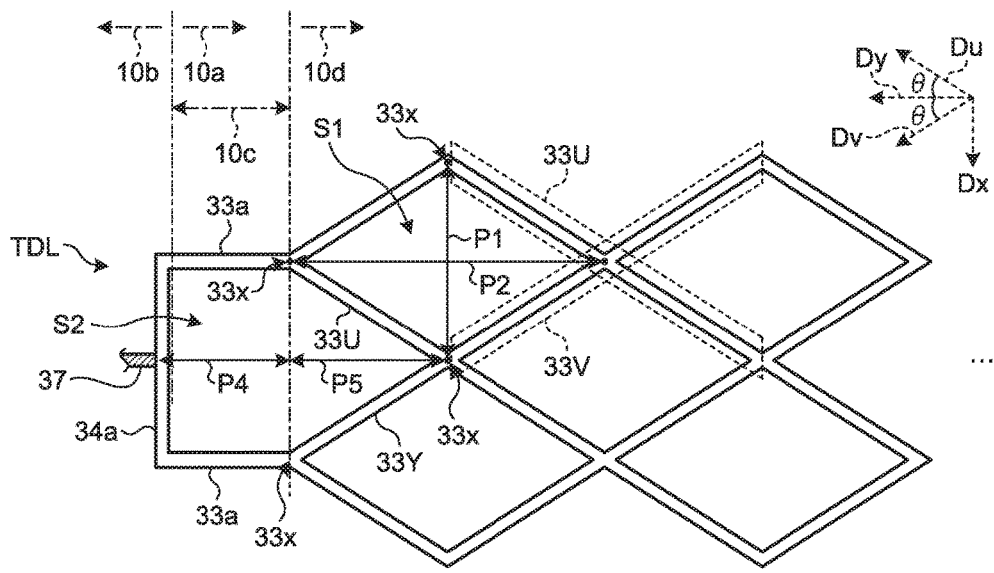
FIG. 15 is a plane view illustrating a detection electrode according to a first modification of the first embodiment.

Next, a detection device according to a first modification of the first embodiment will be described. FIG. 15 is a plane view illustrating a detection electrode according to the first modification of the first embodiment. The same components as those described in the first embodiment are denoted by the same reference numerals, and thus an overlapping description is omitted.

In a detection electrode TDL according to the first modification of the first embodiment, the conductive thin wire 33a extends in the direction Dy as illustrated in FIG. 15. An area S2 surrounded by the coupling wire 34a (or the coupling wire 34b) and the conductive thin wires 33a, 33a, 33U, and 33V can be obtained by the following Expression (6). The shortest distance between the electrical coupling portion 33x closest to the coupling wire 34a and the coupling wire 34a is a distance P4. The distance P5 is a distance that is ½ of the distance P2.

$$S2 = P1 \times P4 + P1 \times P5 \times \frac{1}{2} = P1 \times P4 + P1 \times P2 \times \frac{1}{2} \times \frac{1}{2} \quad (6)$$

When the distance P4 is obtained from Expressions (2) and (6) such that the area S2 is larger than the area S1, a probability is increased that the micro droplets of the insulation material serving as the protective layer 38 drop in the area S2. As a result, a possibility is reduced that an air bubble remains in the space surrounded by the coupling wire 34a (or the coupling wire 34b) and the conductive thin wires 33a, 33a, 33U, and 33V. For example, the distance P4 is preferably a distance (P2×½) or larger.

Second Modification of First Embodiment

Figure 16:
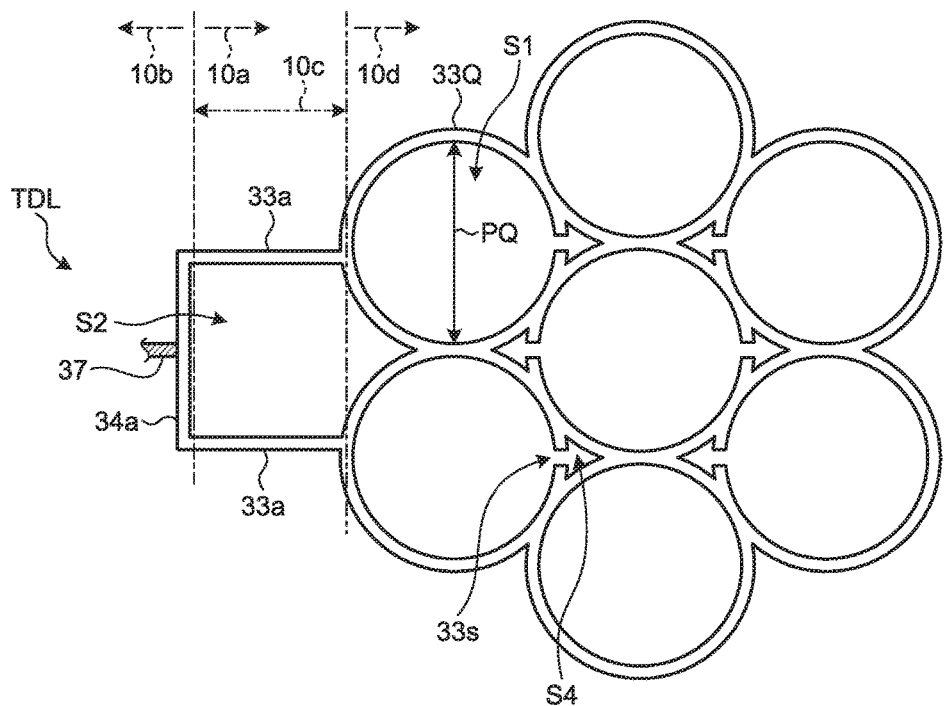
FIG. 16 is a plane view illustrating a detection electrode according to a second modification of the first embodiment.

Next, a detection device according to a second modification of the first embodiment will be described. FIG. 16 is a plane view illustrating a detection electrode according to the second modification of the first embodiment. The same components as those described in the first embodiment are denoted by the same reference numerals, and thus an overlapping description is omitted.

In a detection electrode TDL according to the second modification of the first embodiment, a conductive thin wire 33Q serving as a single mesh is a circle having a diameter PQ as illustrated in FIG. 16. An area S1 surrounded by the conductive thin wire 33Q can be obtained by the following Expression (7).

$$S1=\pi \times (PQ \times \tfrac{1}{2})^2 \qquad (7)$$

In a region surrounded by the three conductive thin wires 33Q, a region in the circle of one conductive thin wire 33Q is coupled with a slit 33s. An area S4 of the region surrounded by the three conductive thin wires 33Q is smaller than the area S1 surrounded by the conductive thin wire 33Q. Even when the micro droplets of the insulation material serving as the protective layer 38 do not drop in the area S4, the area S4 is filled with the insulation material serving as the protective layer 38 from the region in the circle of the conductive thin wire 33Q through the slit 33s. As a result, a possibility that an air bubble remains in the area S4 is reduced.

When an area S2 surrounded by the coupling wire 34a (or the coupling wire 34b) and the conductive thin wire 33a, 33a, and 33Q is larger than the area S1, a probability is increased that the micro droplets of the insulation material serving as the protective layer 38 drop in the area S2. As a result, a possibility can be reduced that an air bubble remains in the space surrounded by the coupling wire 34a (or the coupling wire 34b) and the conductive thin wire 33a, 33a, and 33Q.

Third Modification of First Embodiment

Figure 17:
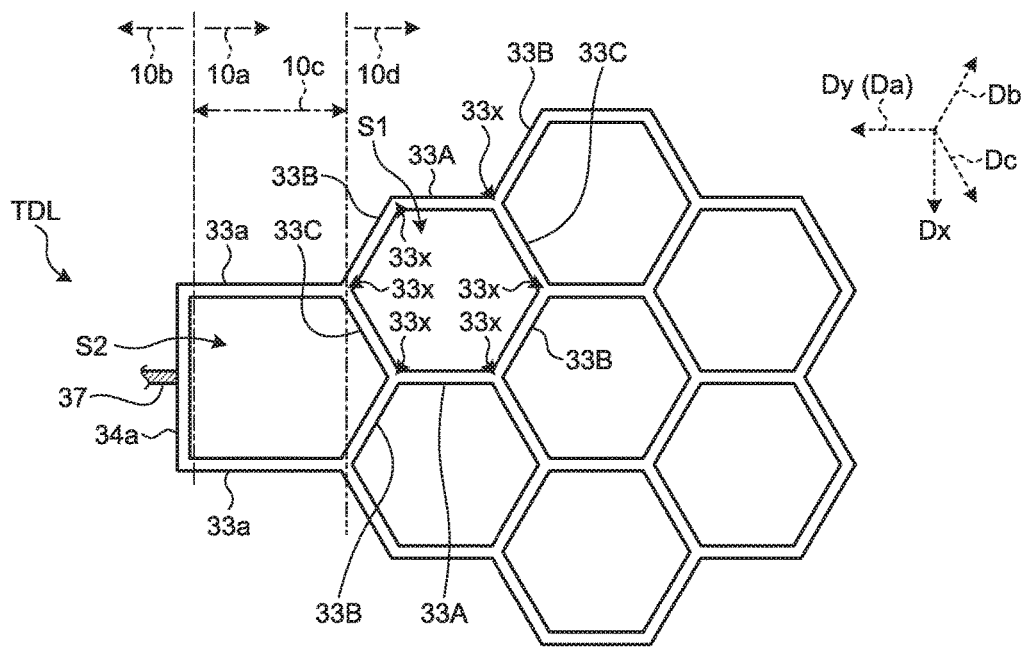
FIG. 17 is a plane view illustrating a detection electrode according to a third modification of the first embodiment.

Next, a detection device according to a third modification of the first embodiment will be described. FIG. 17 is a plane view illustrating a detection electrode according to the third modification of the first embodiment. The same components as those described in the first embodiment are denoted by the same reference numerals, and thus an overlapping description is omitted.

A detection electrode TDL according to the third modification of the first embodiment includes at least one first conductive thin wire 33A extending in a direction Da, at least one second conductive thin wire 33B extending in a direction Db, and at least one third conductive thin wire 33C extending in a direction Dc as illustrated in FIG. 17. In the third modification of the first embodiment, the direction Da is a direction parallel to the direction Dy. A single mesh surrounded by the conductive thin wires 33A, 33B, 33C, 33A, 33B, and 33C has a hexagonal shape. The shape of a region surrounded by a single mesh of the detection electrode TDL is not limited to a hexagon and may be a polygon having four or more corners.

When an area S2 surrounded by the coupling wire 34a (or the coupling wire 34b) and the conductive thin wires 33a, 33a, 33B, and 33C is larger than an area S1 surrounded by the conductive thin wires 33A, 33B, 33C, 33A, 33B, and 33C, a probability is increased that the micro droplets of the insulation material serving as the protective layer 38 drop in the area S2. As a result, a possibility is reduced that an air bubble remains in the space surrounded by the coupling wire 34a (or the coupling wire 34b) and the conductive thin wires 33a, 33a, 33B, and 33C.

Second Embodiment

Figure 18:
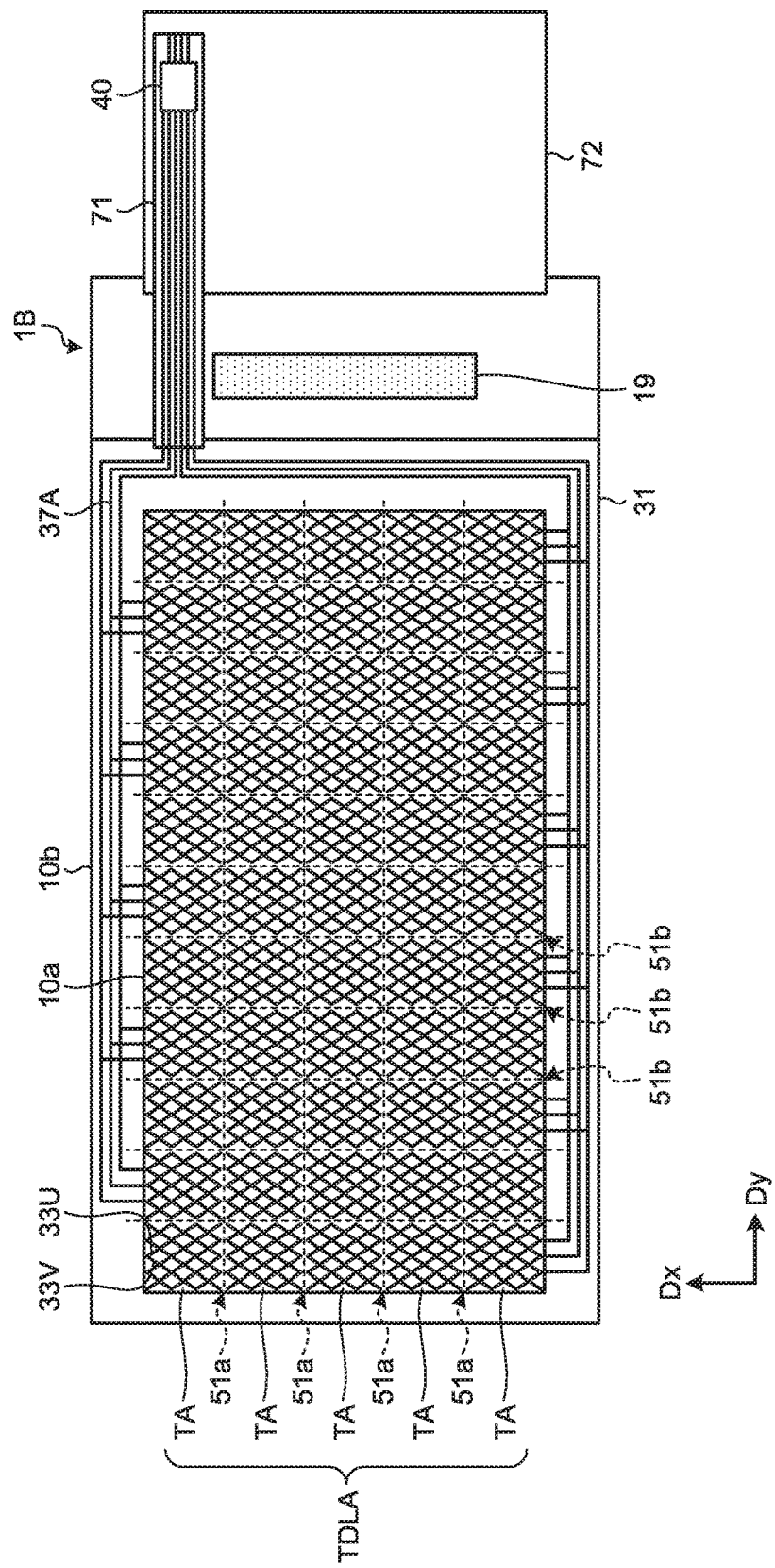
FIG. 18 is a plane view schematically illustrating an example of a display device with a touch detection function according to a second embodiment.
Figure 19:
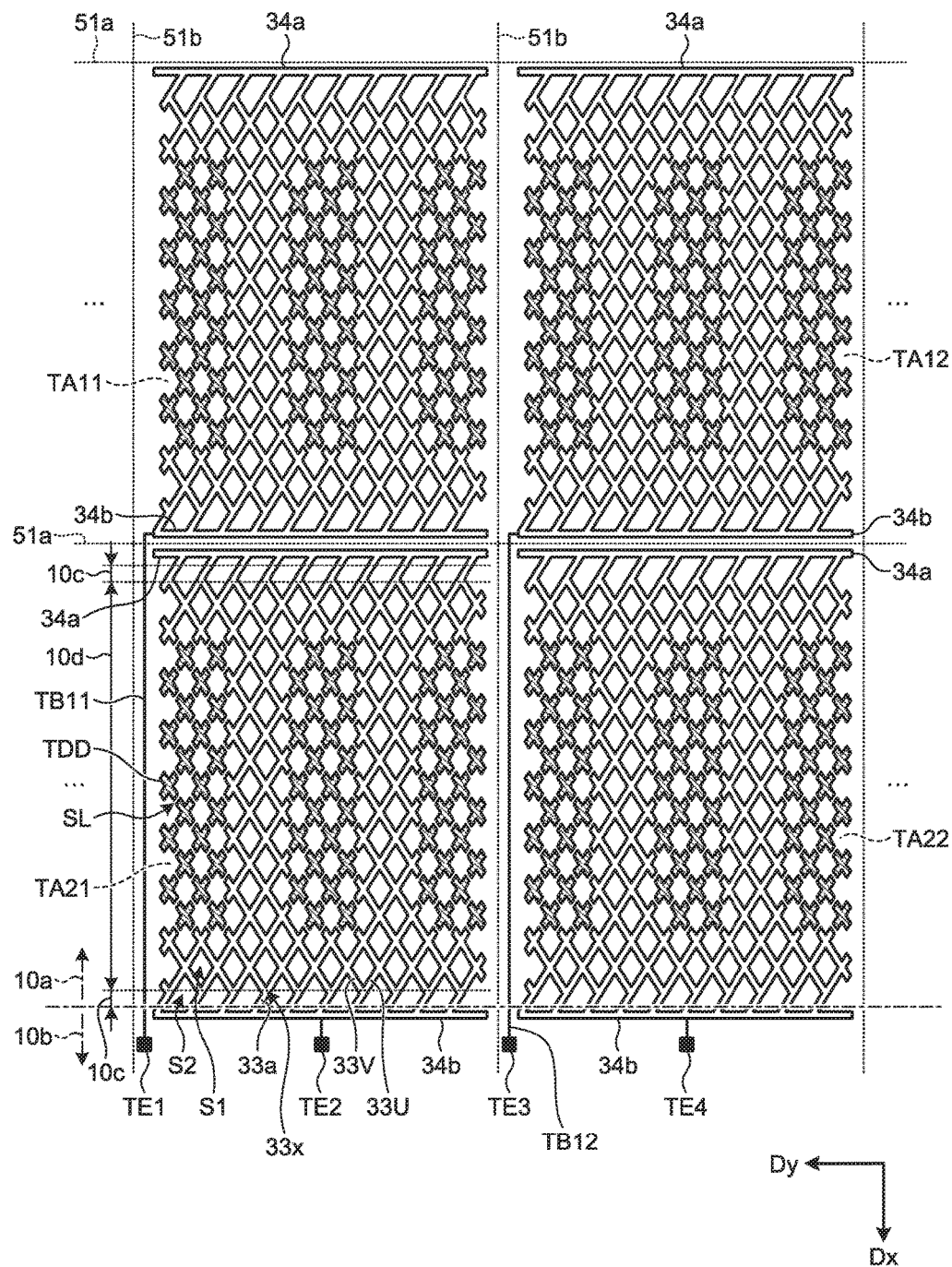
FIG. 19 is a plane view schematically illustrating an enlarged portion of the detection electrode according to the second embodiment.
Figure 20:
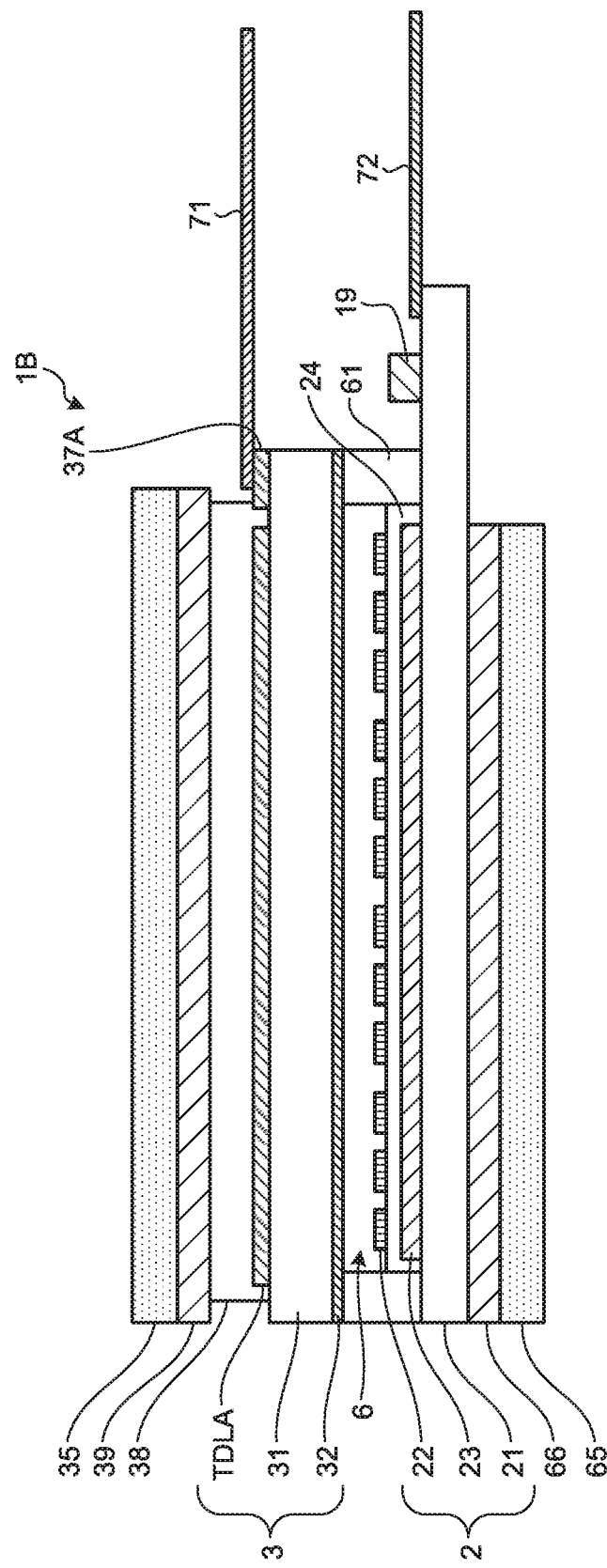
FIG. 20 is a cross-sectional view illustrating a schematic cross-sectional structure of the display device with the touch detection function according to the second embodiment.

FIG. 18 is a plane view schematically illustrating an example of a display device with a touch detection function according to a second embodiment. FIG. 19 is a plane view schematically illustrating an enlarged portion of a detection electrode according to the second embodiment. FIG. 20 is a cross-sectional view illustrating a schematic cross-sectional structure of the display device with the touch detection function according to the second embodiment.

In the first embodiment, the drive electrodes COML of the display unit 10 with the touch detection function serve as the common electrodes that apply the common potential to the pixel electrodes 22 of the display device 20, and also serve as the drive electrodes when the mutual capacitive type touch detection by the detection device 30 is performed. On the other hand, in a display device 1B with a touch detection function according to the second embodiment, the detection device 30 is mounted above the display device 20, and the detection device 30 performs the self-capacitive type of capacitance detection.

A detection electrode TDLA according to the second embodiment includes a plurality of small electrode portions TA arranged in a matrix form as illustrated in FIG. 18. Each of the small electrode portions TA includes a plurality of conductive thin wires 33U extending in a direction along a short side of the display region 10a and a plurality of conductive thin wires 33V. The conductive thin wires 33U and the conductive thin wires 33V are arranged in a mesh-like form, and are line-symmetric about a straight line parallel to one side of the display region 10a serving as a symmetrical axis. The conductive thin wires 33U and the conductive thin wires 33V are alternately arranged in a direction along a long side of the display region 10a, and form mesh-like metallic wiring on substantially the entire surface of the display region 10a.

As illustrated in FIG. 19, the conductive thin wires 33U and 33V are electrically separated from each other by a slit disposed at a position indicated by a dotted line 51a and a slit disposed at a position indicated by a dotted line 51b. One small electrode portion TA is electrically separated from the conductive thin wires 33U and 33V of an adjacent small electrode portion TA and is arranged in an island form. In other words, the small electrode portions TA are separated from one another and arranged in a matrix form.

The small electrode portions TA are coupled to the flexible printed circuit board 71 through respective wires 37A disposed in the frame region 10b. Each of the small electrode portions TA functions as the detection electrode. The display device 1B with the touch detection function according to the present embodiment can detect contact or proximity of an external conductor based on self-capacitance of the small electrode portions TA. The small electrode portions TA each constitute a capacitive touch sensor and are arranged in a matrix form in the display region 10a, and thus a position of contact or proximity of an external conductor can be detected by scanning the entire touch detection surface of the detection device 30.

Figure 21:
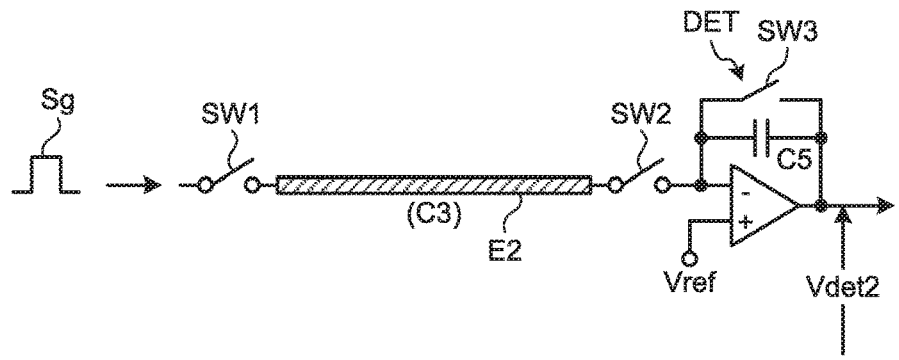
FIG. 21 is a diagram for explaining the basic principle of self-capacitive type touch detection, illustrating a state in which a finger is neither in contact with nor in proximity to a device.
Figure 22:
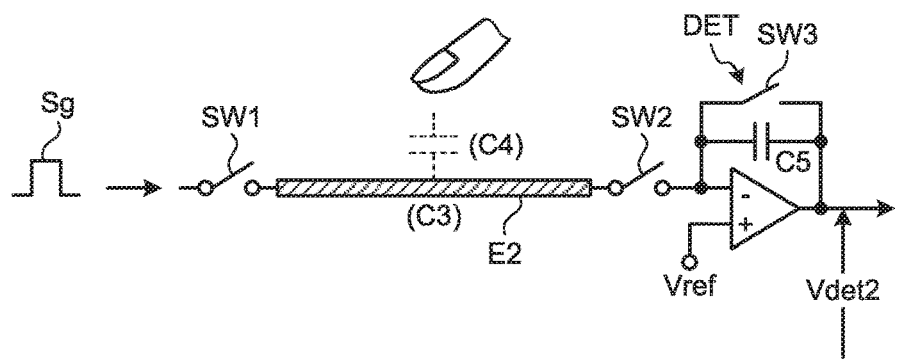
FIG. 22 is a diagram for explaining the basic principle of the self-capacitance type touch detection, illustrating a state in which a finger is in contact with or in proximity to a device.
Figure 23:
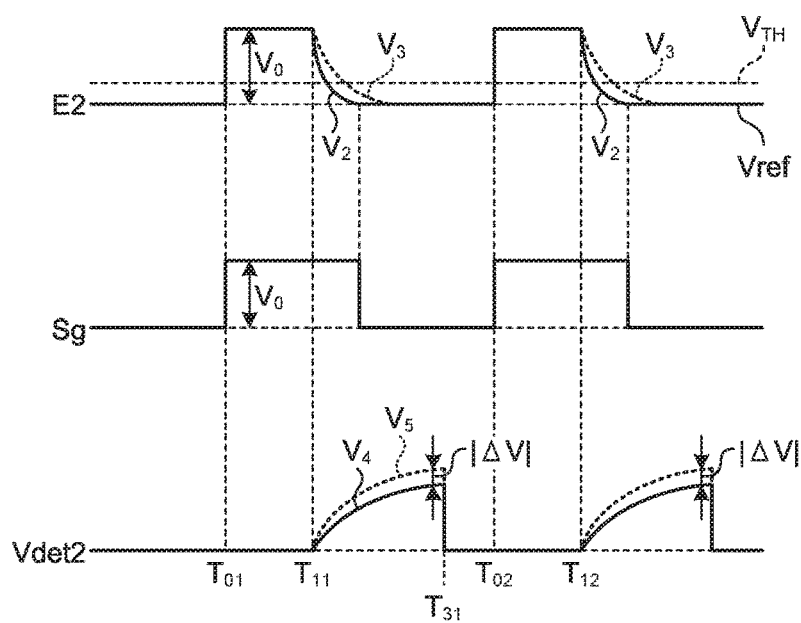
FIG. 23 is a diagram illustrating an example of waveforms of a drive signal and a detection signal.

Next, the basic principle of the self-capacitive type touch detection of the display device 1B with the touch detection function according to the present embodiment will be described with reference to FIGS. 21 to 23. FIG. 21 is a diagram for explaining the basic principle of the self-capacitive type touch detection, illustrating a state in which a finger is neither in contact with nor in proximity to a device. FIG. 22 is a diagram for explaining the basic principle of the self-capacitive type touch detection, illustrating a state in which a finger is in contact with or in proximity to a device. FIG. 23 is a diagram illustrating an example of waveforms of a drive signal and a detection signal. Each of FIG. 21 and FIG. 22 also illustrates a detection circuit.

As illustrated in FIG. 21, in the state in which a finger is neither in contact with nor in proximity to a device, the AC square wave Sg of a predetermined frequency (for example, about several kHz to several hundreds of kHz) is applied to the detection electrode E2. The detection electrode E2 has a capacitance C3, and electric current according to the capacitance C3 flows. The voltage detector DET converts a variation in the electric current according to the AC square wave Sg into a variation in a voltage (a waveform $V_4$ indicated by a solid line, see FIG. 23).

Then, as illustrated in FIG. 22, in the state in which a finger is in contact with or in proximity to a device, a capacitance C4 between the finger and the touch detection is added to the capacitance C3 of the detection electrode E2. Thus, when the AC square wave Sg is applied to the detection electrode E2, electric current according to the capacitance C3 and C4 flows. The voltage detector DET converts a variation in the electric current according to the AC square wave Sg into a variation in a voltage (a waveform $V_5$ indicated by a dotted line) as illustrated in FIG. 23. Then, whether there is a touch or proximity of the finger on the detection electrode E2 can be determined by integrating and comparing the obtained voltage values of the waveform $V_4$ and the waveform $V_5$. In FIG. 23, a method of obtaining periods of time taken until a voltage is lowered to a predetermined reference voltage in the waveform $V_4$ and the waveform $V_5$ and comparing the periods of time may be used.

Specifically, as illustrated in FIGS. 21 and 22, the detection electrode E2 can be disconnected from a power source by a switch SW1 and from the voltage detector DET by a switch SW2. In FIG. 23, the voltage level of the AC square wave Sg is increased by an amount corresponding to a voltage $V_0$ at time $T_{01}$. At this time, the switch SW1 is turned on, and the switch SW2 is turned off. For this reason, the voltage of the detection electrode E2 is also increased to the voltage $V_0$. Then, the switch SW1 is turned off before time $T_{11}$. At this time, the detection electrode E2 is in a floating state, but the potential of the detection electrode E2 is maintained at $V_0$ by the capacitance C3 of the detection electrode E2 (see FIG. 21) or a capacitance (C3+C4, see FIG. 22) obtained by adding the capacitance C4 caused by the touch or proximity of the finger or the like to the capacitance C3 of the detection electrode E2. Further, a switch SW3 is turned on before the time $T_{11}$, and is turned off after a predetermined period of time has elapsed, thereby resetting the voltage detector DET. With this reset operation, the output voltage is made substantially equal to a reference voltage Vref.

Subsequently, when the switch SW2 is turned on at the time $T_{11}$, a voltage in an inverting input unit of the voltage detector DET is increased to the voltage $V_0$ of the detection electrode E2, and thereafter, the inverting input unit of the voltage detector DET is reduced to the reference voltage Vref according to a time constant of the capacitance C3 (or C3+C4) of the detection electrode E2 and that of a capacitance C5 in the voltage detector DET. At this time, since the electric charge accumulated in the capacitance C3 (or C3+C4) of the detection electrode E2 is transferred to the capacitance C5 in the voltage detector DET, the output from the voltage detector DET is increased (Vdet2). When a finger or the like does not come close to the detection electrode E2, the output (Vdet2) from the voltage detector DET becomes the waveform $V_4$ indicated by the solid line, and Vdet2=C3×$V_0$/C5 is satisfied. When the capacitance caused by a finger of the like is added, the output (Vdet2) from the voltage detector DET becomes the waveform $V_5$ indicated by a dotted line, and Vdet2=(C3+C4)×$V_0$/C5 is satisfied.

Thereafter, at time T31 after the electric charge in the capacitance C3 (or C3+C4) of the detection electrode E2 has been sufficiently transferred to the capacitance C5, the switch SW2 is turned off, and the switch SW1 and the switch SW3 are turned on. As a result, the potential of the detection electrode E2 is reduced to a low level as that of the AC square wave Sg, and the voltage detector DET is reset. The timing of turning on the switch SW1 may be any timing after the turning-off of the switch SW2 and before time T02. The timing of resetting the voltage detector DET may be any timing after the turning-off of the switch SW2 and before time T12. The above operation is repeated at a predetermined frequency (for example, about several kHz to several hundred kHz). The presence or absence of an external proximity object (a touch) can be determined based on an absolute value |ΔV| of a difference between the waveform $V_4$ and the waveform $V_5$. As illustrated in FIG. 23, when a finger or the like is not close to the touch detection electrode E2, the potential of the detection electrode E2 has the waveform $V_2$. When the capacitance C4 caused by a finger or the like is added, the electric potential has the waveform $V_3$. The presence or absence of an external proximity object (a touch) can be determined by measuring periods of time until the waveform $V_2$ and the waveform $V_3$ are reduced to a predetermined voltage $V_{TH}$.

In the present embodiment, in the detection device 30, the small electrode portions TA are electrically charged according to the drive signal supplied from the drive electrode driver 14 illustrated in FIG. 1, and thus the self-capacitive type touch detection is performed. Each of the small electrode portions TA outputs the detection signal Vdet2 to the touch detecting unit 40, and the touch detecting unit 40 determines the presence or absence of a touch input and calculates the coordinates of an input position.

Next, a detailed configuration of a detection electrode TDLA according to the present embodiment will be described. In FIG. 19, a direction orthogonal to the arrangement direction of the sub pixel SPix illustrated in FIG. 10 (the extending direction of the scanning signal line GCL) is referred to as a direction Dx, and the arrangement direction of the sub pixel SPix (the extending direction of the pixel signal line SGL) is referred to as a direction Dy.

As illustrated in FIG. 19, the detection electrode TDLA according to the present embodiment includes small electrode portions TA11, TA21, TA12, and TA22. The small electrode portion TA11 includes a plurality of conductive thin wires 33U and a plurality of conductive thin wires 33V. The conductive thin wires 33U and 33V are alternately arranged and respectively coupled with each other, forming a mesh-like structure. The conductive thin wires 33U and 33V are formed of the same material, and the metallic materials described above are used.

The conductive thin wires 33U and the conductive thin wires 33V are coupled with each other such that a bent portion of the conductive thin wire 33U is coupled with a bent portion of the conductive thin wire 33V to form an electrical coupling portion 33x at a crossing portion. The conductive thin wires 33U are electrically coupled with the respective conductive thin wires 33V through the electrical coupling portions 33x at the crossing portions. The small electrode portions TA21, TA12, and TA22 have the same configuration as that of the small electrode portion TAW The small electrode portion TA11 is coupled to a terminal portion TE1 formed in the frame region 10*b* through a display region wiring portion TB11. The display region wiring portion TB11 extends from the coupling wire 34*b* of the small electrode portion TA11 to the frame region 10*b* in the direction Dx. The small electrode portion TA12 is coupled to a terminal portion TE3 formed in the frame region 10*b* through a display region wiring portion TB12 extending from the small electrode portion TA12 to the frame region 10*b* in the direction Dx. The display region wiring portion TB12 extends from the coupling wire 34*b* of the small electrode portion TA12 to the frame region 10*b* in the direction Dx.

Since the small electrode portion TA21 is positioned at the end portion of the display region 10*a*, the conductive thin wires 33U and 33V constituting the small electrode portion TA21 is coupled to a terminal portion TE2 formed in the frame region 10*b* through the coupling wire 34*b*. Similarly, since the small electrode portion TA22 is positioned at the end portion of the display region 10*a*, the conductive thin wires 33U and 33V constituting the small electrode portion TA22 are coupled to a terminal portion TE4 formed in the frame region 10*b* through the coupling wire 34*b*. The terminal portions TE1 to TE4 are coupled with the respective wires 37A illustrated in FIG. 18.

As illustrated in FIG. 19, the display device 1B with the touch detection function according to the present embodiment includes a plurality of dummy electrodes TDD. The dummy electrode TDD is an electrode that does not function as the detection electrode. There is a slit SL between the adjacent dummy electrodes TDD. The dummy electrodes TDD are arranged apart from the small electrode portions TA11, TA21, TA12, and TA22, the terminal portions TE1 to TE4, and the display region wiring portions TB11 and TB12.

The dummy electrode TDD includes a conductive thin wire having substantially the same shape as the conductive thin wire 33U and a conductive thin wire having substantially the same shape as the conductive thin wire 33V. This configuration allows the display device 1B with the touch detection function to decrease a difference in light shielding effect between the region in which the detection electrode TDLA is arranged and the region in which the detection electrode TDLA is not arranged, thereby lowering a possibility that the detection electrode TDLA may be easily viewed.

The display device 1B with the touch detection function according to the present embodiment performs the touch detection based on the self-capacitance of the detection electrode TDLA. For this reason, as illustrated in FIG. 20, a common electrode 23 is disposed on the TFT substrate 21, instead of the drive electrode COML (see FIG. 9). The common electrode 23 is an electrode for applying a common potential to a plurality of pixel electrodes 22 of the display device 20, and is consecutively disposed on the TFT substrate 21, as a solid film of a conductive layers that is made of a transparent conductive oxide.

In the present embodiment, the display operation and the self-capacitive type touch detection operation may be performed in the time division manner. In the touch detection period, the AC square wave Sg is applied to the detection electrode TDLA as the drive signal. In the touch detection period, the common electrode 23 may be in a floating state in which a potential is not fixed, without a voltage signal being applied. The control unit 11 may dive the common electrode 23 as an active shield by applying a voltage signal of the same level as the AC square wave Sg of the drive signal to the common electrode 23 simultaneously with the drive signal.

In the second embodiment, instead of the common electrode 23, the drive electrode COML (see FIG. 9) may be disposed at the TFT substrate 21 side, and the touch detection may be performed based on the mutual capacitance between the drive electrode COML and the detection electrode TDLA.

In the detection electrode TDLA illustrated in FIG. 19 according to the second embodiment, the area densities per unit area of the conductive thin wires 33U and 33V are smaller in the end region 10*c* of the detection electrode TDLA coupled to the coupling wires 34*a* and 34*b* than in the entire main detection region 10*d* of the detection electrode TDLA. In this regard, in the second embodiment, the area S2 is larger than the area S1. Accordingly, a probability is increased that the micro droplets of the insulation material serving as the protective layer 38 drop in the area S2 than in the area S1. As a result, a possibility is reduced that an air bubble remains in the space surrounded by the coupling wire 34*a* or 34*b* and the conductive thin wires 33*a*, 33*a*, 33U, and 33V. As described in the second embodiment, the coupling wire 34*a* or the coupling wire 34*b* may be disposed in the display region 10*a*.

Third Embodiment

Figure 24:
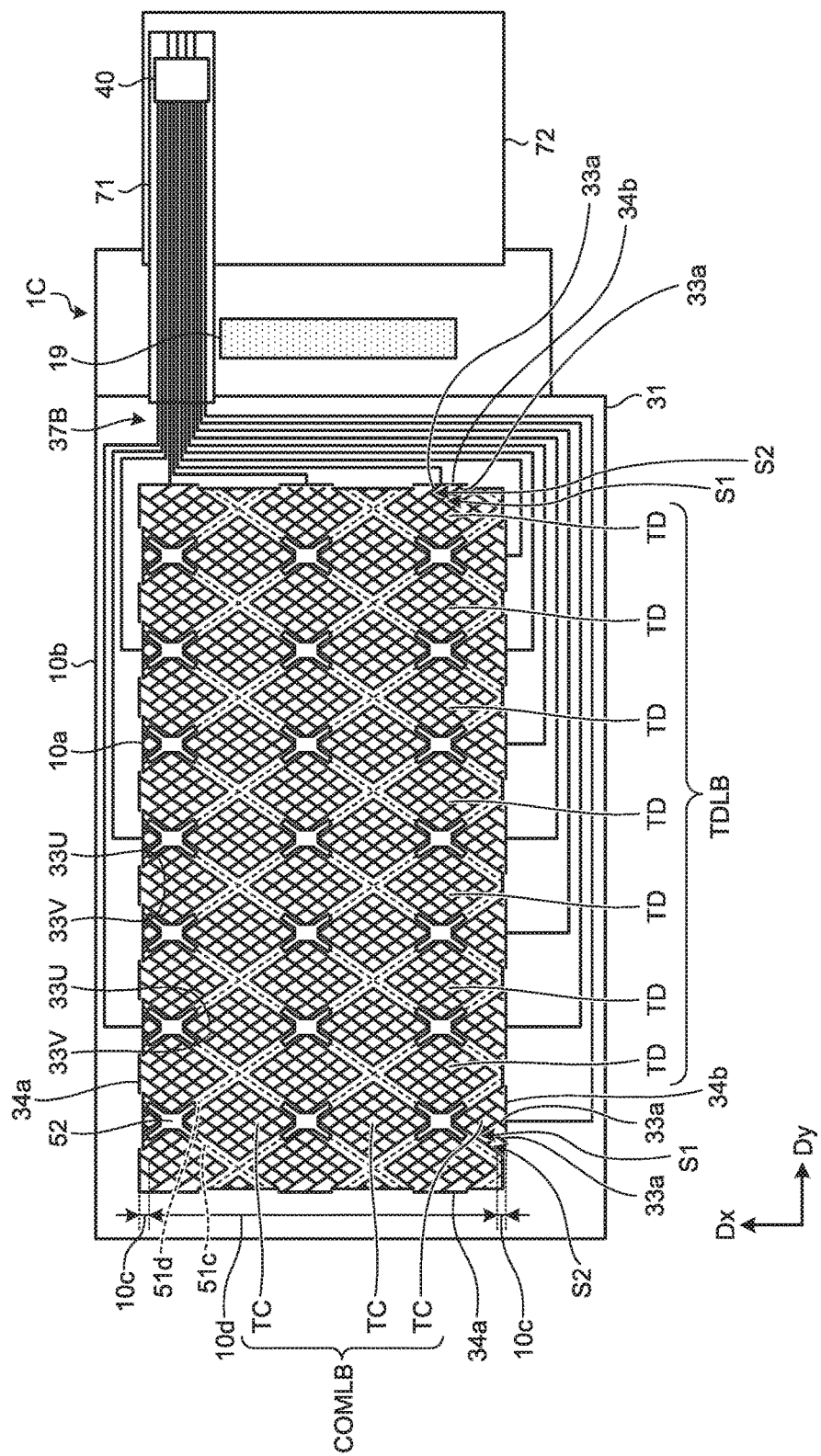
FIG. 24 is a plane view schematically illustrating an example of a display device with a touch detection function according to a third embodiment.
Figure 25:
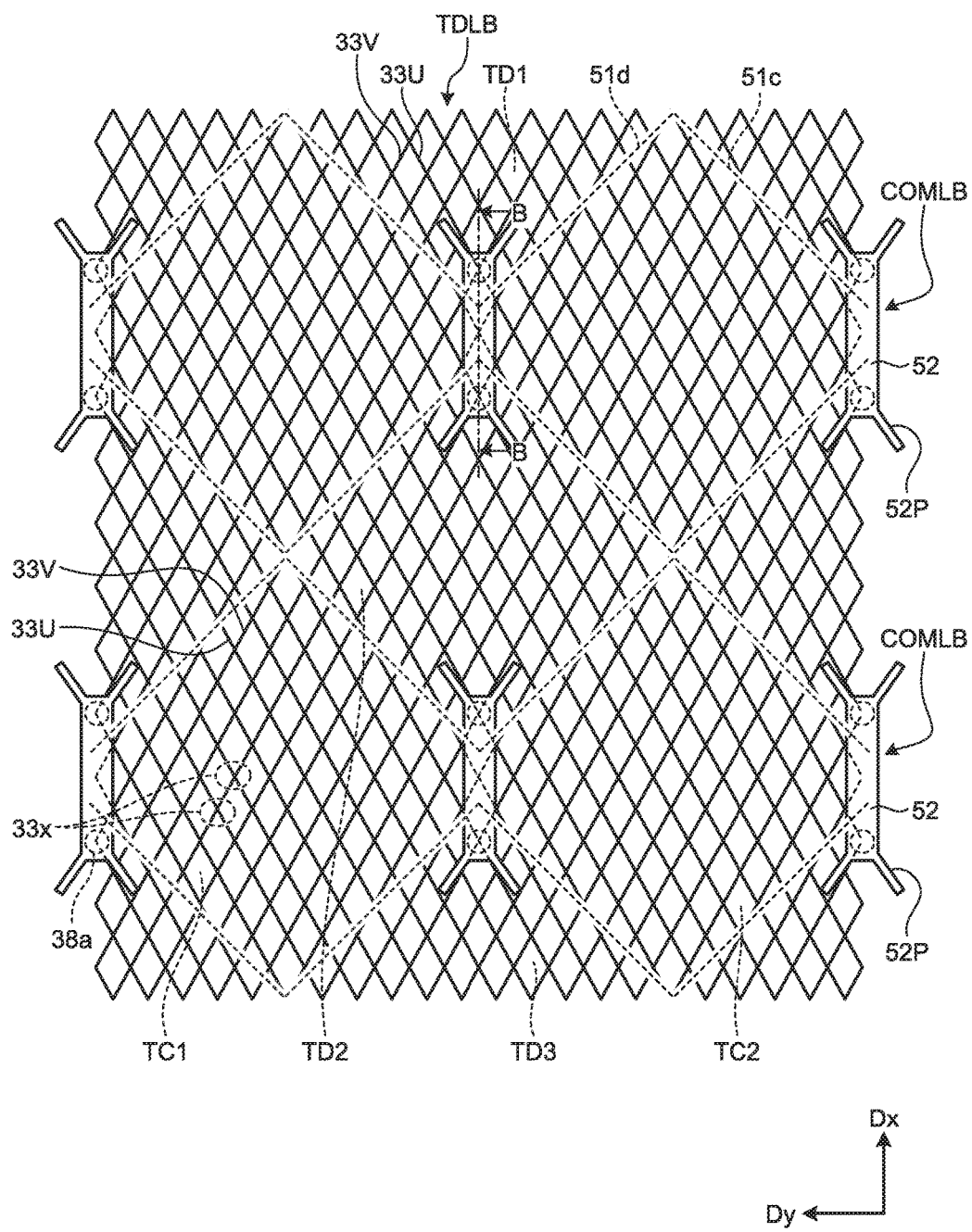
FIG. 25 is a plane view schematically illustrating an enlarged portion of a detection electrode according to the third embodiment.
Figure 26:
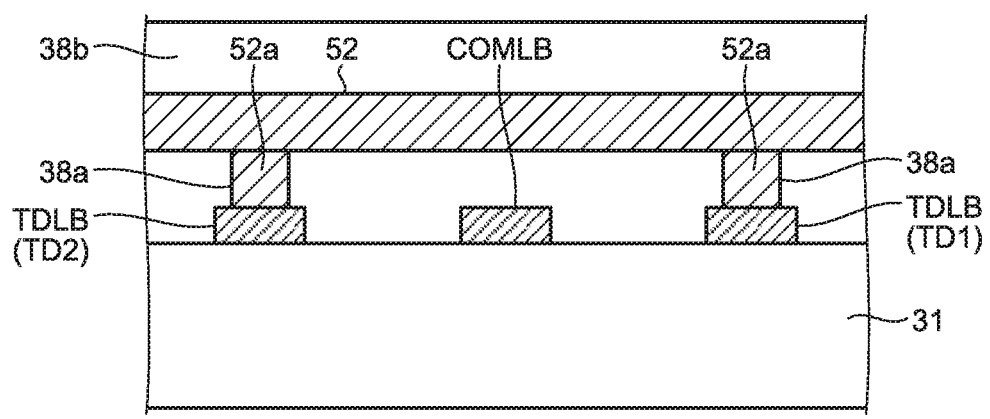
FIG. 26 is a schematic cross-sectional view taken along line B-B of FIG. 25 when viewed in an arrow direction.
Figure 27:
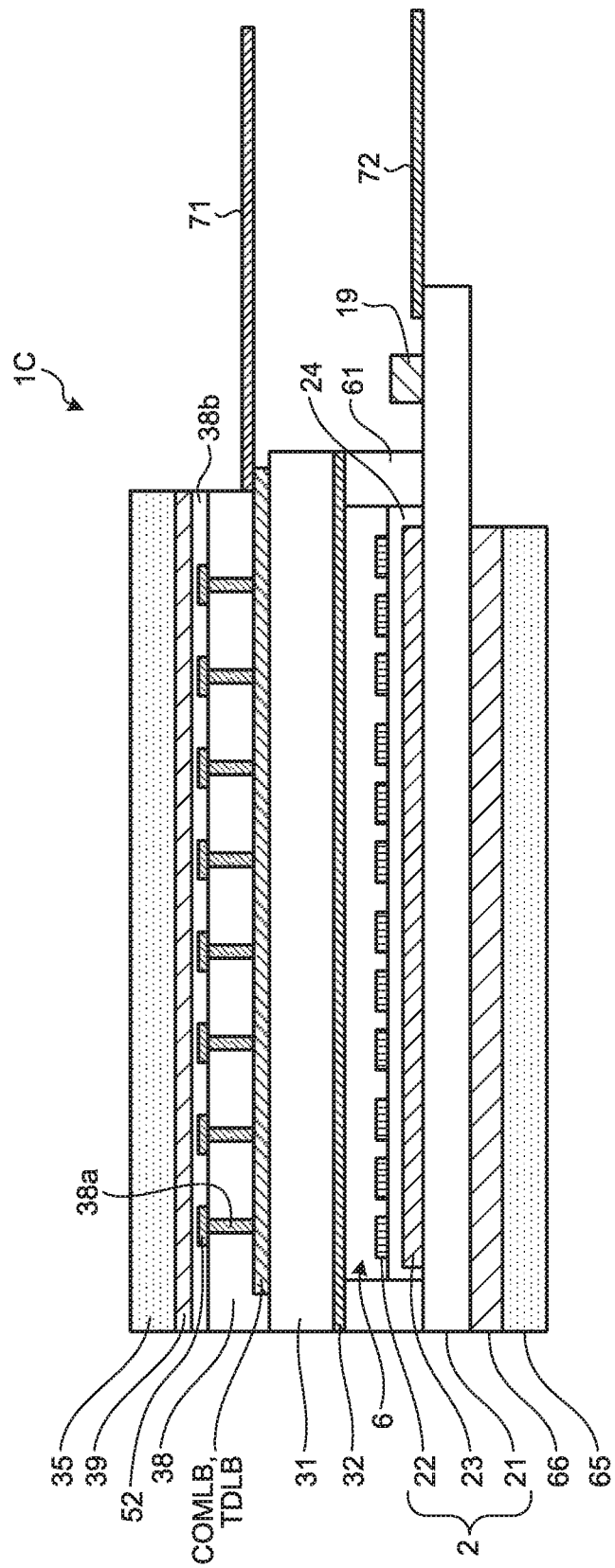
FIG. 27 is a cross-sectional view illustrating a schematic cross-sectional structure of a detection device according to the third embodiment.

FIG. 24 is a plane view schematically illustrating an example of a display device with a touch detection function according to a third embodiment. FIG. 25 is a plane view schematically illustrating an enlarged portion of a detection electrode according to the third embodiment. FIG. 26 is a schematic cross-sectional view taken along line B-B of FIG. 25 when viewed in an arrow direction. FIG. 27 is a cross-sectional view illustrating a schematic cross-sectional structure of the detection device according to the third embodiment.

As illustrated in FIG. 24, in a display device 1C with a touch detection function according to the present embodiment, a drive electrode COMLB and a detection electrode TDLB are disposed on the same plane parallel to the surface of the substrate 31.

The detection electrode TDLB includes a plurality of small electrode portions TD. The outer shape of the small electrode portion TD is a parallelogram. The small electrode portions TD are arranged in a direction along one side of the display region 10*a*. The small electrode portions TD arranged in the direction along one side of the display region 10*a* are coupled with one another through bridge portions 52. As illustrated in FIG. 27, a protective layer 38 is disposed on the detection electrode TDLB and the drive electrode COMLB, and the bridge portion 52 is disposed above the protective layer 38. The detection electrode TDLB and the bridge portion 52 are disposed on different layers and electrically coupled with each other through a through hole 38*a* disposed in the protective layer 38. The bridge portion 52 is further covered with a protective layer 38*b* and protected from corrosion, or the like. The same materials as those of the protective layer 38 described above are used for of the protective layer 38*b*.

One detection electrode TDLB is formed by a row of the small electrode portions TD coupled with one another through the bridge portions 52. The detection electrodes TDLB are arranged in a direction along the other side of the display region 10*a*.

The drive electrode COMLB includes a plurality of small electrode portions TC. The small electrode portion TC is a parallelogram that is substantially the same planar shape as that of the small electrode portion TD of the detection electrode TDLB. The small electrode portions TC are arranged in a direction along the other side of the display region 10a and coupled with one another at positions on which the bridge portions 52 are superimposed. One drive electrode COMLB is formed by the small electrode portions TC arranged in the direction along the other side of the display region 10a. The drive electrodes COMLB are arranged in a direction along one side of the display region 10a.

As illustrated in FIG. 25, each of the detection electrode TDLB and the drive electrode COMLB includes a plurality of conductive thin wires 33U and a plurality of conductive thin wires 33V. The conductive thin wire 33U and the conductive thin wire 33V are arranged in a mesh-like form, and are line-symmetric about a straight line parallel to one side of the display region 10a serving as a symmetrical axis. The conductive thin wire 33U and the conductive thin wire 33V are alternately arranged in a direction along a long side of the display region 10a, and from mesh-like metallic wiring on substantially the entire surface of the display region 10a.

As illustrated in FIG. 25, the conductive thin wires 33U and 33V are electrically separated from each other by a slit disposed at a position along a dotted line 51c or a dotted line 51d. Each of the small electrode portion TD of the detection electrode TDLB and the small electrode portion TC of the drive electrode COMLB includes the conductive thin wire 33U and the conductive thin wire 33V.

The detection electrode TDLB is coupled with wires 37B at one side of the display region 10a. The drive electrode COMLB is coupled with the wires 37B at the other side of the display region 10a. The wires 37B are disposed in the frame region 10b to couple the detection electrode TDLB with the flexible printed circuit board 71, and couple the detection electrode TDLB and the drive electrode COMLB with the flexible printed circuit board 71.

The display device 1C with the touch detection function according to the present embodiment detects a position of contact or proximity of an external conductor based on the mutual capacitance between the detection electrode TDLB and the drive electrode COMLB. The detection device 30 detects a touch input according to the basic principle of the mutual capacitive type touch detection described above.

Next, detailed configurations of the detection electrode TDLB and the drive electrode COMLB according to the present embodiment will be described. As illustrated in FIG. 25, the detection electrode TDLB includes small electrode portions TD1, TD2, and TD3. The drive electrode COMLB includes small electrode portions TC1 and TC2.

In the small electrode portion TC1, the conductive thin wires 33U and the conductive thin wires 33V are coupled with each other such that a bent portion of the conductive thin wire 33U is coupled with a bent portion of the conductive thin wire 33V to form an electrical coupling portion 33x at a crossing portion. The conductive thin wires 33U are electrically coupled with the respective conductive thin wires 33V through the electrical coupling portions 33x at the crossing portions. The small electrode portion TC2 and the small electrode portion TD1, TD2, TD3 of the detection electrode TDLB have the same configurations as that of the small electrode portion TC1.

As illustrated in FIG. 25, the bridge portions 52 are arranged above the drive electrode COMLB with intervals therebetween. Each of the small electrode portion TD1 and TD2 of the detection electrode TDLB is coupled with the bridge portion 52 through a coupling electrode 52a in the through hole 38a. Accordingly, the small electrode portion TD1 is coupled with the small electrode portion TD2 through the bridge portion 52. For the bridge portion 52, a conductive material having translucency such as ITO can be used. The coupling electrode 52a can be formed through the same process as that of the bridge portion 52 by using the same material as that of the bridge portion 52. For the bridge portion 52 and the coupling electrode 52a, the above-described materials for the conductive thin wires 33U and 33V may be used.

As illustrated in FIGS. 26 and 27, the bridge portion 52 is covered with the protective layer 38b formed of the insulation material. The bridge portion 52 includes at least one convex portion 52P in a planar view as illustrated in FIG. 25. Because the bridge portions 52 are dotted about a plane, when the droplet of the insulation material serving as the protective layer 38b spreads and comes into contact with the bridge portion 52, the insulation material may be partially blocked from spreading, and become uneven. The convex portion 52P prompts the spread of the droplet of the insulation material serving as the protective layer 38b so that the periphery of the bridge portion 52 is also easily filled with the insulation material serving as the protective layer 38b.

It is preferable that the convex portions 52P radially extend from the bridge portion 52. This structure can prompt the spread of the droplet of the insulation material serving as the protective layer 38b. The example in which the bridge portion 52 couples the small electrode portions TD has been described above, but the bridge portion 52 may be used to couple the small electrode portions TC.

In the third embodiment, the small electrode portions TD1 and TD2, the protective layer 38b, and the bridge portion 52 are stacked in the described order. The bridge portion 52 only needs to be stacked on a different layer from the small electrode portions TD1 and TD2. Therefore, as a modification of the third embodiment, the bridge portion 52, the protective layer 38b, and the small electrode portions TD1 and TD2 may be stacked in the described order. In this case, the bridge portion 52 is coupled with the small electrode portions TD1 and TD2 that are adjacent to each other with the protective layer 38 interposed therebetween, through the through holes 38a that are coupled below the small electrode portions TD1 and TD2.

The small electrode portion TD2 and the small electrode TC1 adjacent to each other are electrically separated from each other by slits disposed in the conductive thin wires 33U and 33V at positions indicated by the dotted lines 51c and 51d of FIG. 25. Similarly, the adjacent small electrode portions TD2 and TC2 are electrically separated from each other by the slits disposed in the conductive thin wires 33U and 33V. In this manner, the small electrode portions TD are separated from the small electrode portion TC, and a capacitance is formed between the small electrode portion TD of the detection electrode TDLB and the small electrode portion TC of the drive electrode COMLB adjacent to the small electrode portion TD.

In the present embodiment, the detection electrode TDLB and the drive electrode COMLB are disposed on the same plane parallel to the surface of the substrate 31. Thus, as illustrated in FIG. 27, the common electrode 23, instead of the drive electrode COML (see FIG. 9), is disposed on the TFT substrate 21. The common electrode 23 is an electrode for applying a common potential to a plurality of pixel electrodes 22 of the display device 20, and is consecutively disposed on the TFT substrate 21, as a solid film of a conductive layers that is made of a transparent conductive oxide.

In the detection electrode TDLB illustrated in FIG. 24 according to the third embodiment, the area densities per unit area of the conductive thin wires 33U and 33V are smaller in the end region 10c of the detection electrode TDLB coupled to each of the coupling wires 34a and 34b than in the entire main detection region 10d of the detection electrode TDLB. In this regard, in the third embodiment, the area S2 is larger than the area S1. Accordingly, a probability that the micro droplets of the insulation material serving as the protective layer 38 drop in the area S2 is higher than in the area S1. As a result, a possibility is reduced that an air bubble remains in the space surrounded by the coupling wire 34a or 34b, and the conductive thin wires 33a, 33a, 33U, and 33V.

The preferred embodiments of the present invention have been described above, but the present invention is not limited to the above embodiments. The disclosure of the above embodiments is merely an example, and various modifications can be made within the scope not departing from the gist of the present invention. The various modifications made without departing from the gist of the invention naturally fall within the scope of the invention.

For example, the shapes, the line widths, and the space widths of the conductive thin wires 33U, 33V, 33Q, 33A, 33B, and 33C can be appropriately modified. The conductive thin wire 33U and the conductive thin wire 33V are line-symmetric about the straight line parallel to the direction Dy serving as the symmetrical axis, but the present invention is not limited thereto, and the conductive thin wire 33U and the conductive thin wire 33V may be asymmetric.

In the second embodiment, the dummy electrode TDD is disposed on the same plane as the detection electrode TDLA, but the dummy electrode TDD may be disposed even in the display devices 1 and 1C with the touch detection function according to the first and third embodiments, respectively. For example, the dummy electrode TDD may be arranged between the adjacent conductive thin wires 33U and 33V illustrated in FIG. 8. The dummy electrode TDD may be arranged between the adjacent detection electrodes TDL. The dummy electrode TDD may be arranged in the slits disposed at the positions along the dotted lines 51a and 51b or the dotted lines 51c and 51d.

The components of the above-described embodiment may be appropriately combined. The present invention can naturally provide other advantageous effects that are provided by the aspects described in the embodiments above and are clearly defined by the description in the present specification or appropriately conceivable by those skilled in the art.

What is claimed is:

1. A detection device, comprising:
   a substrate;
   a detection electrode including:
      a first electrode portion including:
         a first thin wire extending at a first angle with respect to a first direction;
         a second thin wire extending at a second angle different from the first angle with respect to the first direction; and
         a first bent portion coupling the first thin wire and the second thin wire;
      a second electrode portion adjacent to the first electrode portion in the first direction including:
         a third thin wire extending at a third angle with respect to the first direction;
         a fourth thin wire extending at a fourth angle different from the third angle with respect to the first direction; and
         a second bent portion coupling the third thin wire and the fourth thin wire; and
      a coupling portion including;
         a fifth thin wire extending in the first direction and separated from the first bent portion and the second bent portion in a second direction crossing the first direction;
         a sixth thin wire coupling the fifth thin wire and the first bent portion; and
         a seventh thin wire coupling the fifth thin wire and the second bent portion;
   a coupling wire coupled to the fifth thin wire of the coupling portion, and a protective layer covering the detection electrode and the coupling wire.

2. The detection device according to claim 1, wherein the second thin wire, the third thin wire, the fifth thin wire, the sixth thin wire, and the seventh thin wire substantially form a pentagon.

3. The detection device according to claim 1, wherein the first angle is substantially equal to the third angle.

4. The detection device according to claim 3, wherein the second angle is substantially equal to the fourth angle.

5. The detection device according to claim 1, wherein the first thin wire is in parallel to the third thin wire.

6. The detection device according to claim 5, wherein the second thin wire is in parallel to the fourth thin wire.

7. The detection device according to claim 1, wherein the first electrode portion further includes:
   an eighth thin wire extending at an eighth angle with respect to the first direction and coupled to the first thin wire, and
   a ninth thin wire extending at a ninth angle different from the eighth angle with respect to the first direction and coupled to the second thin wire and the eighth thin wire.

8. The detection device according to claim 7, wherein the first thin wire, the second thin wire, the eighth thin wire, and the ninth thin wire substantially form a quadrangle.

9. The detection device according to claim 7, wherein the first angle is substantially equal to the ninth angle.

10. The detection device according to claim 9, wherein the second angle is substantially equal to the eighth angle.

11. The detection device according to claim 7, wherein the first thin wire is in parallel to the ninth thin wire.

12. The detection device according to claim 11, wherein the second thin wire is in parallel to the eighth thin wire.

13. The detection device according to claim 1, wherein the second thin wire is coupled to the third thin wire.

14. The detection device according to claim 1, wherein a width of the fifth thin wire is greater than a width of the first bent portion in the first direction.

15. The detection device according to claim 1,
wherein an angle between the fifth thin wire and the seventh thin wire is greater than an angle between the third thin wire and the fourth thin wire.

16. The detection device according to claim 15,
wherein an angle between the fifth thin wire and the sixth thin wire is greater than an angle between the first thin wire and the second thin wire.

17. The detection device according to claim 15,
wherein the seventh thin wire is in parallel to the second thin wire.

18. The detection device according to claim 15,
wherein the seventh thin wire extends at the second angle with respect to the first direction.

19. The detection device according to claim 1,
wherein the first electrode portion further includes:
   an eighth thin wire extending at an eighth angle with respect to the first direction;
   a ninth thin wire extending at a ninth angle different from the eighth angle with respect to the first direction;
   a tenth thin wire coupled to the first thin wire and the eighth thin wire; and
   an eleventh thin wire coupled to the second thin wire, the third thin wire, and the ninth thin wire.

20. The detection device according to claim 19,
wherein the first thin wire, the second thin wire, the eighth thin wire, the ninth thin wire, the tenth thin wire, and the eleventh thin wire substantially form a hexagon.

\* \* \* \* \*